(12) United States Patent
Pfeiffer et al.

(10) Patent No.: US 10,329,402 B2
(45) Date of Patent: *Jun. 25, 2019

(54) PLASTICIZER COMPOSITION WHICH COMPRISES CYCLOALKYL ESTERS OF SATURATED DICARBOXYLIC ACIDS AND 1,2-CYCLOHEXANEDICARBOXYLIC ESTERS

(71) Applicant: BASF SE, Ludwigshafen (DE)

(72) Inventors: Matthias Pfeiffer, Böhl-Iggelheim (DE); Boris Breitscheidel, Waldsee (DE); Axel Grimm, Edenkoben (DE); Herbert Morgenstern, Ellerstadt (DE)

(73) Assignee: BASF SE (DE)

( * ) Notice: Subject to any disclaimer, the term of this patent is extended or adjusted under 35 U.S.C. 154(b) by 171 days.

This patent is subject to a terminal disclaimer.

(21) Appl. No.: 15/517,766

(22) PCT Filed: Oct. 8, 2015

(86) PCT No.: PCT/EP2015/073267
§ 371 (c)(1),
(2) Date: Apr. 7, 2017

(87) PCT Pub. No.: WO2016/055573
PCT Pub. Date: Apr. 14, 2016

(65) Prior Publication Data
US 2017/0313850 A1  Nov. 2, 2017

(30) Foreign Application Priority Data

Oct. 9, 2014  (EP) ..................................... 14188352

(51) Int. Cl.
*C08K 5/12* (2006.01)
*C08K 5/10* (2006.01)
(Continued)

(52) U.S. Cl.
CPC .............. *C08K 5/12* (2013.01); *C08K 5/0016* (2013.01); *C08K 5/10* (2013.01); *C08K 5/11* (2013.01);
(Continued)

(58) Field of Classification Search
None
See application file for complete search history.

(56) References Cited

U.S. PATENT DOCUMENTS 2,921,089 A  1/1960 Hagemeyer, Jr. et al.
3,418,351 A  12/1968 Greene et al.
(Continued)

FOREIGN PATENT DOCUMENTS

DE  1593368 A1  7/1970
DE  1945359 A1  3/1971
(Continued)

OTHER PUBLICATIONS

U.S. Appl. No. 15/517,825, filed Apr. 7, 2017.
(Continued)

*Primary Examiner* — Peter A Salamon
(74) *Attorney, Agent, or Firm* — Drinker Biddle & Reath LLP

(57) ABSTRACT

The present invention relates to a plasticizer composition which comprises at least one cycloalkyl ester of saturated dicarboxylic acids and at least one 1,2-cyclohexanedicarboxylic ester, to molding compositions which comprise a thermoplastic polymer or an elastomer and this plasticizer composition, and to the use of these plasticizer compositions and molding compositions.

25 Claims, 7 Drawing Sheets

(51) Int. Cl.
*C08K 5/11* (2006.01)
*C08L 27/06* (2006.01)
*C08K 5/00* (2006.01)

(52) U.S. Cl.
CPC ......... *C08L 27/06* (2013.01); *C08L 2205/025* (2013.01); *C08L 2205/06* (2013.01)

(56) References Cited

U.S. PATENT DOCUMENTS

| | | | |
|---|---|---|---|
| 3,932,523 | A | 1/1976 | Strohmeyer et al. |
| 4,009,124 | A | 2/1977 | Laurer et al. |
| 4,148,830 | A | 4/1979 | Pruett et al. |
| 4,426,524 | A | 1/1984 | Plummer |
| 5,281,647 | A | 1/1994 | Eapen |
| 5,288,918 | A | 2/1994 | Maher et al. |
| 5,434,313 | A | 7/1995 | Harrison et al. |
| 5,563,290 | A * | 10/1996 | Ito .................. B01J 31/2295 560/146 |
| 5,696,297 | A | 12/1997 | Kneuper et al. |
| 5,849,972 | A | 12/1998 | Vicari et al. |
| 6,225,507 | B1 | 5/2001 | Giessler et al. |
| 6,284,917 | B1 * | 9/2001 | Brunner .................. C07C 51/36 560/127 |
| 6,310,235 | B1 | 10/2001 | Gick |
| 6,310,261 | B1 | 10/2001 | Geissler et al. |
| 6,372,942 | B1 | 4/2002 | Brivet et al. |
| 6,437,170 | B1 | 8/2002 | Thil et al. |
| 6,723,884 | B1 | 4/2004 | Grenacher et al. |
| 6,765,119 | B2 | 7/2004 | Hoffmann et al. |
| 6,888,021 | B2 | 5/2005 | Brunner et al. |
| 7,173,138 | B2 | 2/2007 | Ahlers et al. |
| 7,208,545 | B1 | 4/2007 | Brunner et al. |
| 7,323,588 | B2 | 1/2008 | Grass et al. |
| 7,385,075 | B2 | 6/2008 | Disteldorf et al. |
| 7,855,340 | B2 * | 12/2010 | Gosse ..................... C08K 5/12 174/110 V |
| 7,973,194 | B1 * | 7/2011 | Kinkade .................. C07C 69/75 528/272 |
| 8,329,796 | B2 | 12/2012 | Grass |
| 9,084,983 | B2 | 7/2015 | Königsmann et al. |
| 2006/0052497 | A1 * | 3/2006 | Hopfmann ............... C08K 5/16 524/236 |
| 2010/0292121 | A1 | 11/2010 | Jacquot et al. |
| 2011/0083780 | A1 * | 4/2011 | Hayashi ................ B60C 1/0016 152/517 |
| 2013/0317152 | A1 | 11/2013 | Becker et al. |
| 2015/0018471 | A1 | 1/2015 | Facklam |
| 2015/0284611 | A1 * | 10/2015 | Thiemann ................ C09D 5/18 524/437 |
| 2016/0053083 | A1 * | 2/2016 | Rhers ....................... C08K 5/10 521/145 |
| 2016/0312004 | A1 | 10/2016 | Wagner et al. |
| 2016/0326347 | A1 | 11/2016 | Wagner et al. |
| 2017/0044352 | A1 | 2/2017 | Storzum et al. |
| 2017/0145186 | A1 | 5/2017 | Pfeiffer et al. |

FOREIGN PATENT DOCUMENTS

| | | | | |
|---|---|---|---|---|
| DE | 2139630 | A1 | 2/1973 | |
| DE | 2244373 | A1 | 4/1974 | |
| DE | 2404855 | A1 | 8/1975 | |
| DE | 2445303 | A1 | 4/1976 | |
| DE | 2612355 | A1 | 10/1977 | |
| DE | 2628987 | A1 | 1/1978 | |
| DE | 3228881 | A1 | 2/1984 | |
| DE | 4339713 | A1 | 5/1995 | |
| EP | 366089 | A2 | 5/1990 | |
| EP | 695734 | A1 | 2/1996 | |
| EP | 880494 | B1 | 5/2000 | |
| EP | 1047655 | B1 | 5/2003 | |
| EP | 1354867 | A2 | 10/2003 | |
| EP | 1813645 | A1 | 8/2007 | |
| EP | 2631267 | A1 | 8/2013 | |
| FR | 2060622 | A5 | 6/1971 | |
| GB | 1579159 | A | 11/1980 | |
| RU | 2057115 | C1 | 3/1996 | |
| WO | WO-95014647 | A1 | 6/1995 | |
| WO | WO-9823566 | A1 | 6/1998 | |
| WO | WO-9932427 | A1 | 7/1999 | |
| WO | WO-0063151 | A1 | 10/2000 | |
| WO | WO-0078704 | A1 | 12/2000 | |
| WO | WO-01014297 | A1 | 3/2001 | |
| WO | WO-01/87809 | A1 | 11/2001 | |
| WO | WO-02038531 | A1 | 5/2002 | |
| WO | WO-0283695 | A1 | 10/2002 | |
| WO | WO-03029339 | A1 * | 4/2003 | ............... C08K 5/12 |
| WO | WO-05028407 | A1 | 3/2005 | |
| WO | WO-2009095126 | A1 | 8/2009 | |
| WO | WO-2011082991 | A2 | 7/2011 | |
| WO | WO-2012069278 | A1 | 5/2012 | |
| WO | WO-2014166955 | A2 * | 10/2014 | ............... C08K 5/10 |

OTHER PUBLICATIONS

International Search Report for PCT/EP2015/073266 dated Jan. 5, 2016.
International Search Report for PCT/EP2015/073267 dated Jan. 5, 2016.
Written Opinion of the International Searching Authority for PCT/EP2015/073266 dated Jan. 5, 2016.
Written Opinion of the International Searching Authority for PCT/EP2015/073267 dated Jan. 5, 2016.

* cited by examiner

PLASTICIZER COMPOSITION WHICH COMPRISES CYCLOALKYL ESTERS OF SATURATED DICARBOXYLIC ACIDS AND 1,2-CYCLOHEXANEDICARBOXYLIC ESTERS

CROSS-REFERENCE TO RELATED APPLICATIONS

This application is a national stage application (under 35 U.S.C. § 371) of PCT/EP2015/073267, filed Oct. 8, 2015, which claims benefit of European Application No. 14188352.0, filed Oct. 9, 2014, both of which are incorporated herein by reference in their entirety.

BACKGROUND TO THE INVENTION

The present invention relates to a plasticizer composition which comprises at least one cycloalkyl ester of saturated dicarboxylic acids and at least one 1,2-cyclohexanedicarboxylic ester, to molding compositions which comprise a thermoplastic polymer or an elastomer and this plasticizer composition, and to the use of these plasticizer compositions and molding compositions.

PRIOR ART

Desired processing properties or desired performance characteristics are achieved in many plastics by adding what are known as plasticizers in order to render the plastics softer, more flexible and/or more extensible. The addition of plasticizers generally serves to shift the thermoplastic region of plastics to lower temperatures, so as to obtain the desired elastic properties at lower processing temperatures and lower usage temperatures.

Production quantities of polyvinyl chloride (PVC) are among the highest of any plastic. Because this material is versatile, it is nowadays found in a wide variety of products used in everyday life. PVC therefore has very great economic importance. PVC is intrinsically a plastic that is hard and brittle up to about 80° C., and is used in the form of rigid PVC (PVC-U) by adding heat stabilizers and other additives. Flexible PVC (PVC-P) is obtained only by adding suitable plasticizers, and can be used for many applications for which rigid PVC is unsuitable.

Examples of other important thermoplastic polymers in which plasticizers are usually used are polyvinyl butyral (PVB), homo- and copolymers of styrene, polyacrylates, polysulfides, and thermoplastic polyurethanes (PUs).

The suitability of any substance for use as plasticizer for a particular polymer depends substantially on the properties of the polymer to be plasticized. Desirable plasticizers are generally those having high compatibility with the polymer to be plasticized, i.e. those which give good thermoplastic properties, and have only low susceptibility to loss by evaporation and/or by exudation (have high permanence).

There are many different compounds marketed for plasticizing PVC and other plastics. Phthalic diesters with alcohols of different chemical structure have in the past often been used as plasticizers because they have good compatibility with PVC and advantageous performance characteristics, examples being diethylhexyl phthalate (DEHP), diisononyl phthalate (DINP) and diisodecyl phthalate (DIDP). Short-chain phthalates, e.g. dibutyl phthalate (DBP), diisobutyl phthalate (DIBP), benzyl butyl phthalate (BBP) or diisoheptyl phthalate (DIHP), are also used as fast fusing plasticizers (so called "fast fuser"), for example in the production of what are known as plastisols. It is also possible to use dibenzoic esters, such as dipropylene glycol dibenzoates, for the same purpose alongside the short-chain phthalates. Phenyl and cresyl esters of alkylsulfonic acids are another class of plasticizers with good gelling properties, and are marketed under the brand name Mesamoll®.

Plastisols initially are a suspension of finely pulverulent plastics in liquid plasticizers. The solvation rate of the polymer in the plasticizer here is very low at ambient temperature. The polymer is noticeably solvated in the plasticizer only on heating to relatively high temperatures. The individual isolated polymer aggregates here swell and fuse to give a three-dimensional high-viscosity gel. This procedure is termed gelling, and begins at a certain minimum temperature which is termed gel point or solubility temperature. The gelling step is not reversible.

Since plastisols take the form of liquids, these are very often used for the coating of a very wide variety of materials, e.g. textiles, glass nonwovens, etc. This coating is very often composed of a plurality of sublayers.

In a procedure often used in the industrial processing of plastisols, a layer of plastisol is therefore applied and then the plastic, in particular PVC, with the plasticizer is subjected to incipient gelling above the solubility temperature, thus producing a solid layer composed of a mixture of gelled, partially gelled, and ungelled polymer particles. The next sublayer is then applied to this incipiently gelled layer, and once the final layer has been applied the entire structure is processed in its entirety to give the fully gelled plastics product by heating to relatively high temperatures.

Another possibility, alongside production of plastisols, is production of dry pulverulant mixtures of plasticizer and polymers. These dry blends, in particular based on PVC, can then be further processed at elevated temperatures for example by extrusion to give pellets, or processed through conventional shaping processes, such as injection molding, extrusion, or calendering, to give the fully gelled plastics product.

Plasticizers with good gelling properties are additionally required because of increasing technical and economical demands on the processing of thermoplastic polymers and elastomers.

In particular in the production and processing of PVC plastisols, for example for producing PVC coatings, it is inter alia desirable to have a plasticizer with low gelling point, these materials being known as fast fusers. High storage stability of the plastisol is moreover also desirable, i.e. the ungelled plastisol is intended to exhibit no, or only a slight, viscosity rise over the course of time at ambient temperature. As far as possible, these properties are intended to be achieved by addition of a suitable plasticizer with rapid-gelling properties, with no need for the use of other viscosity-reducing additives and/or of solvents.

However, fast fusers generally often have unsatisfactory compatibility with the polymer/additive mixtures, and likewise have unsatisfactory permanence. Furthermore, fast fusers often show a high volatility, both during processing and during the use of the final products. Besides this, the addition of fast fusers often has an adverse effect on the mechanical properties of the final products. Another known method for establishing the desired plasticizer properties is therefore to use mixtures of plasticizers, e.g. at least one plasticizer which provides good thermoplastic properties but provides relatively poor gelling, in combination with at least one fast fuser.

There is moreover a requirement to replace at least some of the phthalate plasticizers mentioned in the introduction because these are suspected of being hazardous to health. This applies specifically to sensitive application sectors such as toys, packaging for food or drink, and medical items.

The prior art discloses various alternative plasticizers with different properties for a variety of plastics and specifically for PVC.

A plasticizer class that is known from the prior art and that can be used as alternative to phthalates is based on the cyclohexanepolycarboxylic acids described in WO 99/32427. Unlike their unhydrogenated aromatic analogs, these compounds give no rise to toxicological concerns, and can be used even in sensitive application sectors. The corresponding lower alkyl esters generally have rapid-gelling properties.

WO 00/78704 describes selected dialkylcyclohexane-1,3- and 1,4-dicarboxylic esters for the use as plasticizer in synthetic materials.

U.S. Pat. No. 7,973,194 B1 teaches the use of dibenzyl cyclohexane-1,4-dicarboxylate, benzyl butyl cyclohexane-1,4-dicarboxylate, and dibutyl cyclohexane-1,4-dicarboxylate as rapid-gelling plasticizers for PVC.

EP 1354867 describes isomeric benzoic isononyl esters, their mixtures with phthalic alkyl esters, adipic alkyl esters or cyclohexanedicarboxylic alkyl esters as well as a process for their production. Furthermore, EP 1354867 describes the use of said mixtures as plasticizer in plastics, in particular in PVC and PVC-plastisols. To reach a gelling temperature that is sufficiently low for plastisol applications, large amounts of the benzoic isononyl esters are required. Moreover, these plasticizers are highly volatile and their addition has an adverse effect on the mechanical properties of the final products.

EP 1354867 describes isomeric benzoic dodecyl esters, their mixtures with phthalic alkyl esters, adipic alkyl esters or cyclohexanedicarboxylic alkyl esters as well as the use of said mixtures as plasticizer in polymers, in particular as plasticizer in PVC and PVC-plastisols. To reach a gelling temperature that is sufficiently low for plastisol applications, large amounts of said benzoic dodecyl esters have to be applied. Moreover, these plasticizers are also highly volatile and their addition has an adverse effect on the mechanical properties of the final products.

WO 03/029339 describes PVC-compositions comprising mixtures of cyclohexanepolycarboxylic esters with different fast-fusing plasticizers. As suitable fast-fusing plasticizers different esters of benzoic acid, aromatic sulfonic acids, citric acid as well as phosphoric acids are mentioned in particular. In this regard, also lower alkyl esters of dicarboxylic acids, such as dibutyladipate, are mentioned casually. However, WO 03/029339 explicitly teaches, that lower alkyl esters of dicarboxylic acids are only usefull as fast-fusing plasticizers to a limited extent, since the use of larger amounts of these compounds in PVC-compositions results in an undesired high plasticizer volatility.

It is an object of the present invention to provide a plasticizer composition for thermoplastic polymers and elastomers which on the one hand provides good thermoplastic and mechanical properties and on the other hand provides good gelling properties, i.e. a low gel point. The plasticizer composition is intended thus to be particularly suitable for providing plastisols. The plasticizer composition is intended to have high compatibility with the polymer to be plasticized, and to have high permanence, and moreover to be free from toxicological concerns. Furthermore, the plasticizer composition is intended to exhibit a low volatility, both during processing and during the use of the final products.

More specifically, it is an object of the present invention to provide a non-phthalate mixing component for Hexamoll® DINCH® (cyclohexane-1,2-dicarboxylic acid diisononylester), which serves as a fast fusing plasticizer combined with a high plasticizer efficiency as well as low volatility, resulting in a non-phthalate plasticizer mixture with similar gelation properties as diisononylphthalate (DINP).

Surprisingly, said object is achieved by a plasticizer composition comprising
a1) one or more compounds of the general formula (I.a),

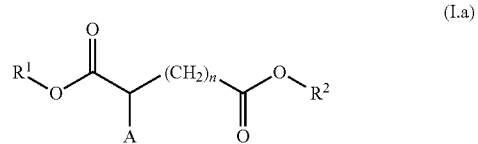

in which
A is methyl or ethyl,
n is 1 or 2 and
$R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety,
b) one or more compounds of the general formula (II),

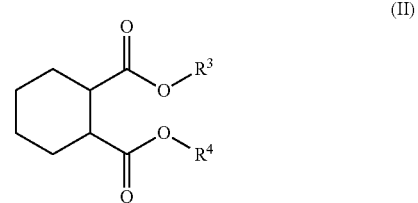

in which
$R^3$ and $R^4$ are selected independently of each other from branched and unbranched $C_7$-$C_{12}$-alkyl moieties.

The invention further relates to plasticizer composition as defined above, comprising additionally
a2) one or more compounds of the general formula (I.b),

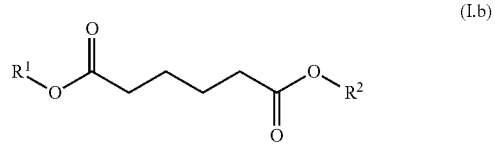

in which
$R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

The invention further provides molding compositions which comprise at least one thermoplastic polymer or elastomer and one plasticizer composition as defined above and hereinafter.

The invention further provides the use of a plasticizer composition as defined above and hereinafter as plasticizer for thermoplastic polymers, in particular polyvinyl chloride (PVC), and elastomers.

The invention further provides the use of a plasticizer composition as defined above and hereinafter as plasticizer in plastisols.

The invention further provides the use of said molding compositions for the production of moldings and foils.

DESCRIPTION OF THE INVENTION

The plasticizer compositions of the invention have one or more of the following advantages:

The plasticizer compositions of the invention feature high compatibility with the polymer to be plasticized, in particular PVC.

The plasticizer compositions of the invention have high permanence, and nevertheless provide excellent gelling properties to the polymer to be plasticized, The plasticizer compositions of the invention exhibit a low volatility, both during processing and during the use of the final products.

The plasticizer compositions of the invention have advantageous suitability for achieving a wide variety of very different and complex processing properties and usage properties of plastics.

The plasticizer composition of the invention is advantageously suitable for the production of plastisols.

The compounds (I.a), alone or in combination with the compounds (I.b), have very good suitability as fast fusers by virtue of their extremely low solubility temperatures in accordance with DIN 53408. Even small amounts of the compounds (I.a), optionally together with compounds (I.b), in the plasticizer composition of the invention are sufficient to reduce the temperature required for the gelling of a thermoplastic polymer and/or to increase the gelling rate thereof.

The plasticizer compositions of the invention are suitable for the use for the production of moldings and foils for sensitive application sectors, examples being medical products, packaging for food and drink, products for the interior sector, for example in dwellings and in vehicles; other examples are toys, child-care items, etc.

The compounds (I.a) as well as the compounds (I.b) can be produced by using readily obtainable starting materials.

The processes for the production of the compounds (I.a) and (I.b) used according to the invention are simple and efficient. Thus, the compounds (I.a) and (I.b) can be provided without difficulty on a large industrial scale.

As mentioned above, it has surprisingly been found that the compounds of the general formula (I.a), alone or in combination with the compounds (I.b), have very low solubility temperatures, and also excellent gelling properties.

It has been found that the compounds (I.a), optionally together with compounds (I.b), specifically in combination with 1,2-cyclohexanedicarboxylic esters of the general formula (II) are suitable for improving the gelling performance of thermoplastic polymers and elastomers. Even small amounts of the compounds (I.a), optionally together with compounds (I.b), in the plasticizer composition of the invention are sufficient to reduce the temperature required for the gelling and/or to increase the gelling rate.

For the purposes of the present invention, the expression "fast fuser" means a plasticizer which has a solubility temperature in accordance with DIN 53408 below 120° C. These fast fusers are in particular used for the production of plastisols.

The compounds of the general formula (I.a) are chiral at the methyl- or ethyl-substituted carbon atom (C-2). In this regard, the invention relates either to the pure (2R)-stereoisomer or the pure (2S)-stereoisomer of the respective esters of the general formula (I.a) as well as to mixtures of respective esters of the general formula (I.a) comprising both (2R)- and (2S)-stereoisomers in any and all ratios. The pure isomers and the isomer mixtures of any desired composition are equally suitable as fast fusers.

For the purposes of the present invention, the expression "$C_1$-$C_{10}$-alkyl" comprises straight-chain having from 1 to 10 carbon atoms or branched alkyl groups having from 3 to 10 carbon atoms. Among these are methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, isooctyl, 2-ethylhexyl, n-nonyl, isononyl, 2-propylhexyl, n-decyl, isodecyl, 2-propylheptyl and the like. Preferred, $C_1$-$C_{10}$-alkyl comprises straight-chain $C_1$-$C_8$-alkyl groups or branched $C_3$-$C_8$-alkyl groups. Particularly preferable are straight-chain $C_1$-$C_5$-alkyl groups or branched $C_3$-$C_5$-alkyl groups.

The expression "$C_7$-$C_{12}$-alkyl" comprises straight-chain and branched $C_7$-$C_{12}$-alkyl groups. It is preferable that $C_7$-$C_{12}$-alkyl is selected from n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the like. It is particularly preferable that $C_7$-$C_{12}$-alkyl is n-octyl, n-nonyl, isononyl, 2-ethylhexyl, isodecyl, 2-propylheptyl, n-undecyl, or isoundecyl.

The expression "$C_5$-$C_7$-cycloalkyl" comprises for the purposes of the present invention cyclic hydrocarbons having from 5 to 7, in particular having 6, carbon atoms. Among these are cyclopentyl, cyclohexyl and cycloheptyl.

Substituted $C_5$-$C_7$-cycloalkyl groups can, as permitted by their ring size, have one or more (e.g. 1, 2, 3, 4, or 5) $C_1$-$C_{10}$-alkyl substituents. Examples of $C_5$-$C_7$-cycloalkyl groups are 2- and 3-methylcyclopentyl, 2-, and 3-ethylcyclopentyl, 2-, 3-, and 4-methyl-cyclohexyl, 2-, 3-, and 4-ethylcyclohexyl, 2-, 3-, and 4-propylcyclohexyl, 2-, 3-, and 4-isopropylcyclohexyl, 2-, 3-, and 4-butylcyclohexyl, 2-, 3-, and 4-sec-butylcyclohexyl, 2-, 3-, and 4-tert-butylcyclohexyl, 2-, 3-und 4-methylcycloheptyl, 2-, 3-und 4-ethylcycloheptyl, 2-, 3-und 4-propylcycloheptyl, 2-, 3-und 4-isopropylcycloheptyl, 2-, 3-und 4-butylcycloheptyl, 2-, 3-und 4-sec.-butylcycloheptyl, and 2-, 3-und 4-tert-butylcyclohexptyl.

In a first preferred embodiment of the invention, the plasticizer composition, as defined above, comprises one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and optionally one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

More specifically, in this first preferred embodiment, the plasticizer composition, as defined above, comprises, in each case based on the total weight of compounds (I.a) and, if present, (I.b), 70 to 100% by weight of one or more compounds (I.a), wherein A is methyl, n is 2 and Wand $R^2$ are selected independently of each other from $C_5$-$C_7$-cycloalkyl, where the cycloalkyl moieties are unsubstituted or can be substituted by at least one $C_1$-$C_{10}$-alkyl moiety, and 0 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

Also more specifically, in said first embodiment of the invention, the plasticizer composition, as defined above, comprises, in each case based on the total weight of compounds (I.a) and, if present, (I.b), 95 to 100% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and 0 to 5% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

Also more specifically, in said first embodiment of the invention, the plasticizer composition, as defined above, comprises, in each case based on the total weight of compounds (I.a) and, if present, (I.b), 70 to 99% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and 1 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

In a second preferred embodiment of the invention, the plasticizer composition, as defined above, comprises one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, optionally one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and optionally one or more compounds of the general formula (I.b).

More specifically, in this second preferred embodiment of the invention, the plasticizer composition, as defined above, comprises, in each case based on the total weight of compounds (I.a) and, if present, (I.b), 70 to 100% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, 0 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and 0 to 10% by weight of one or more compounds of the general formula (I.b).

Also more specifically, in this second preferred embodiment of the invention, the plasticizer composition, as defined above, comprises, in each case based on the total weight of compounds (I.a) and, if present, (I.b), 70 to 98% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, 1 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and 1 to 10% by weight of one or more compounds of the general formula (I.b).

In a third preferred embodiment of the invention, the plasticizer composition, as defined above, comprises one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

More specifically, in this third preferred embodiment, the plasticizer composition, as defined above, comprises, in each case based on the total weight of compounds (I.a) and, if present, (I.b), 70 to 95% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and 5 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

Also more specifically, in this third preferred embodiment, the plasticizer composition, as defined above, comprises, in each case based on the total weight of compounds (I.a) and, if present, (I.b), 70 to 95% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, 5 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and 0 to 10% by weight of one or more compounds of the general formula (I.b).

It is preferable that the moieties $R^1$ and $R^2$ in the compounds of the general formula (I.a) and (I.b) are independently of each other cyclopentyl, cyclohexyl and cycloheptyl.

In a further preferred embodiment, the definitions of the moieties $R^1$ and $R^2$ in the compounds of the general formula (I.a) and (I.b) are identical.

Preferred compounds of the general formula (I.a) are selected from
2-methylglutaric acid dicyclopentylester,
2-methylglutaric acid dicyclohexylester,
2-methylglutaric acid dicycloheptylester,
2-ethylsuccinic acid dicyclopentylester,
2-ethylsuccinic acid dicyclohexylester,
2-ethylsuccinic acid dicycloheptylester, and also mixtures of 2 or more of the abovementioned compounds.

Preferred compounds of the general formula (I.b) are selected from
adipic acid dicyclopentylester,
adipic acid dicyclohexylester,
adipic acid dicycloheptylester,
and also mixtures of 2 or more of the abovementioned compounds.

Particularly preferred compounds of the general formula (I.a) are 2-methylglutaric acid dicyclohexylester and 2-ethylsuccinic acid dicyclohexylester.

A particularly preferred compound of the general formula (I.b) is adipic acid dicyclohexylester.

2-methylglutaric acid dicyclohexylester is available from the company Solvay, Brussels, Belgium, and may contain 2-ethylsuccinic acid dicyclohexylester.

It has been found that a combination of 2-methylglutaric acid dicyclohexylester and 2-ethylsuccinic acid dicyclohexylester, alone or optionally together with adipic acid dicyclohexylester, is particularly advantageous for use as fast fuser.

In another preferred embodiment, the definitions of the moieties $R^3$ and $R^4$ in the compounds of the general formula (II) are identical.

It is preferable that both of the moieties $R^3$ and $R^4$ in the compounds of the general formula (II) are 2-ethylhexyl, or both are isononyl, or both are 2-propylheptyl.

A particularly preferred compound of the general formula (II) is di(isononyl) 1,2-cyclohexanedicarboxylate.

By adjusting the fractions of compounds (I.a) and, if present, (I.b) to compounds (II) in the plasticizer composition according to the invention, the plasticizing properties can be adapted to the respective application. This can be achieved by routine experiments. To further modify the plasticizer properties of the plasticizer composition according to the invention, e. g. when the plasticizer composition is used in special applications, it might be helpful to add further plasticizers apart from compounds (I.a), (I.b) and (II). Therefore, the plasticizer composition, as defined above, can comprise at least one further plasticizer, which differs from the compounds (I.a), (I.b) and (II).

The at least one further plasticizer, which differs from the compounds (I.a), (I.b) and (II), is selected from dialkyl phthalates, alkyl aralkyl phthalates, dialkyl cyclohexan-1,2-dicarboxylates which differ from compounds (II), dialkyl cyclohexane-1,3-dicarboxylates, dialkyl cyclohexane-1,4-dicarboxylates, dialkyl terephthalates, dialkyl terephthalates, trialkyl trimellitates, alkyl benzoates, dibenzoic esters of glycols, hydroxybenzoic esters, esters of saturated monocarboxylic acids, esters of unsaturated monocarboxylic acids, esters of saturated dicarboxylic acids, which differ from compounds (I.a) and (I.b), esters of unsaturated dicarboxylic acids, amides and esters of aromatic sulfonic acids, alkylsulfonic esters, glycerol esters, isosorbide esters, phosphoric esters, citric triesters, alkylpyrrolidone derivatives, dialkyl 2,5-furan-dicarboxylates, dialkyl 2,5-tetrahydrofurandicarboxylates, epoxidized vegetable oils and epoxidized fatty acid monoalkylesters, polyesters made of aliphatic and/or aromatic polycarboxylic acids with at least dihydric alcohols.

Suitable dialkyl phthalates that may advantageously be mixed with the compounds (I.a), (II) and, if present, (I.b) have independently of each other from 4 to 13 carbon atoms, preferably from 7 to 13 carbon atoms, in the alkyl chains. An example of a suitable alkyl aralkyl phthalate is benzyl butyl phthalate. Suitable dialkyl cyclohexan-1,2-dicarboxylates which differ from compounds (II), have independently of each other in each case from 3 to 6 carbon atoms, in particular from 4 to 6 carbon atoms, in the alkyl chains. Suitable dialkyl cyclohexane-1,3-dicarboxylates have, independently of one another, 4 to 13 C atoms, preferably 8 to 13 C atoms, in the alkyl chains. Suitable dialkyl cyclohexane-1,4-dicarboxylates have, independently of one another, 4 to 13 C atoms, preferably 8 to 11 C atoms, in the alkyl chains. An example of a suitable dialkyl cyclohexane-1,4-dicarboxylates is di-(2-ethylhexyl)-cyclohexane-1,4-dicarboxylate. Suitable dialkyl terephthalates have independently of each other in each case from 4 to 13 carbon atoms, in particular from 7 to 11 carbon atoms, in the alkyl chains. Examples of suitable dialkyl terephthalates are di(n-butyl) terephthalate, di(2-ethylhexyl) terephthalate, di(isononyl) terephthalate and di(2-propylheptyl) terephthalate. Suitable trimellitates have independently of each other in each case from 4 to 13 carbon atoms, in particular from 7 to 11 carbon atoms, in the alkyl chains. Suitable alkyl benzoates have independently of each other in each case from 7 to 13 carbon atoms, in particular from 9 to 13 carbon atoms, in the alkyl chains. Examples of suitable alkyl benzoates are isononyl benzoate, isodecyl benzoate, and 2-propylheptyl benzoate. Suitable dibenzoic esters of glycols are diethylene glycol dibenzoate, dipropylene glycol dibenzoate, tripropylene glycol dibenzoate and dibutylene glycol dibenzoate. Suitable esters of saturated monocarboxylic acids are for example esters of acetic acid, butyric acid, valeric acid, or lactic acid. Suitable esters of unsaturated monocarboxylic acids are for example esters of acrylic acid. Suitable esters of saturated dicarboxylic acids, which differ from compounds (I.a) and (I.b), are esters of succinic acid, glutaric acid, sebacic acid, malic acid, tartaric acid, or dialkylesters of 2-ethyl-succinic acid, 2-methylglutaric acid or adipic acid. Suitable dialkylesters of 2-ethyl-succinic acid, 2-methylglutaric acid or adipic acid have independently of each other in each case from 4 to 13 carbon atoms, in particular from 6 to 10 carbon atoms, in the alkyl moieties. It is preferable that the esters of unsaturated dicarboxylic acids are esters of maleic acid and of fumaric acid. Suitable alkylsulfonic esters preferably have an alkyl moiety having from 8 to 22 carbon atoms. Among these are by way of example the phenyl and cresyl esters of pentadecylsulfonic acid. Suitable isosorbide esters are isosorbide diesters, preferably esterified with $C_8$-$C_{13}$-carboxylic acids. Suitable phosphoric esters are tri-2-ethylhexyl phosphate, trioctyl phosphate, triphenyl phosphate, isodecyl diphenyl phosphate, bis(2-ethylhexyl) phenyl phosphate, and 2-ethylhexyl diphenyl phosphate. The OH group in the citric triesters can be present in free or carboxylated form, preferably in acetylated form. It is preferable that the alkyl moieties of the acetylated citric acid triesters have independently of each other from 4 to 8 carbon atoms, in particular from 6 to 8 carbon atoms. Suitable alkylpyrrolidone derivatives have alkyl moieties of 4 to 18 carbon atoms. Suitable dialkyl 2,5-furan-dicarboxylates have independently of each other from 4 to 13 carbon atoms, preferably from 5 to 12 carbon atoms, in the alkyl chains. Suitable dialkyl 2,5-tetrahydrofurandicarboxylates have independently of each other from 4 to 13 carbon atoms, preferably from 5 to 12 carbon atoms, in the alkyl chains. A suitable epoxidized vegetable oil is by way of example epoxidized soy oil, e.g. obtainable from Galata-Chemicals, Lampertheim, Germany. Epoxidized fatty acid monoalkylesters, e.g. obtainable under the trademark reFlex™ from PolyOne, USA, are also useful. The polyesters made of aliphatic and aromatic polycarboxylic acids are preferably polyesters of adipic acid with polyhydric alcohols, in particular dialkylene glycol polyadipates having from 2 to 6 carbon atoms in the alkylene moiety.

In all of the abovementioned cases, the alkyl moieties can in each case be linear or branched and in each case identical or different. Reference is made to the general descriptions relating to suitable and preferred alkyl moieties in the introduction.

The amount of the at least one further plasticizer, which differs from compounds (I.a), (I.b) and (II), in the plasticizer composition of the invention is from 0 to 50% by weight, preferable from 0 to 40% by weight, more preferable from 0 to 30% by weight, and in particular from 0 to 25% by weight, based on the total weight of the at least one further plasticizer and the compounds (I.a), (II) and, if present, (I.b) in the plasticizer composition.

In a preferred embodiment no further plasticizer different from compounds (I.a), (I.b) and (II), as defined above, is added to the plasticizer composition according to the invention.

It is preferable that the content of compounds of the general formulae (I.a) and, if present, (I.b) in the plasticizer composition of the invention is from 5 to 70% by weight, in particular from 10 to 50% by weight, based on the total weight of the compounds (I.a), (II) and, if present, (I.b) in the plasticizer composition.

It is preferable that the content of compounds of the general formula (II) in the plasticizer composition of the invention is from 30 to 95% by weight, in particular from 50 to 90% by weight, based on the total weight of the compounds (I.a), (II) and, if present, (I.b) in the plasticizer composition.

The ratio by weight of compounds of the general formulae (I.a) and, if present, (I.b) to compounds of the general formula (II) in the plasticizer composition of the invention is typically in the range from 1:20 to 2:1, preferable in the range from 1:10 to 1:1.

Molding Compositions

The present invention further provides a molding composition comprising at least one polymer and one plasticizer composition as defined above.

In one preferred embodiment, the polymer comprised in the molding composition is a thermoplastic polymer.

Thermoplastic polymers that can be used are any of the thermoplastically processable polymers. In particular, these are thermoplastic polymers selected from homo- or copolymers which comprise at least one copolymerized monomer selected from $C_2$-$C_{10}$-monoolefins (such as ethylene or propylene), 1,3-butadiene, 2-chloro-1,3-butadiene, esters of $C_2$-$C_{10}$-alkanoic acids with vinyl alcohol, vinyl chloride, vinylidene chloride, vinylidene fluoride, tetrafluoroethylene, glycidyl acrylate, glycidyl methacrylate, acrylates and methacrylates of branched or unbranched $C_1$-$C_{10}$-alcohols, vinylaromatics (such as styrene), (meth)acrylonitrile, maleic anhydride, and α,β-ethylenically unsaturated mono- and dicarboxylic acids, homo- and copolymers of vinyl acetals, polyvinyl esters,
polycarbonates (PC),
polyesters, such as polyalkylene terephthalates, polyhydroxyalkanoates (PHA), polybutylene succinates (PBS), polybutylene succinate adipates (PBSA),
polyethers,
polyether ketones,
thermoplastic polyurethanes (TPU),
polysulfides,
polysulfones,
and mixtures thereof.

Mention may be made by way of example of polyacrylates having identical or different alcohol moieties from the group of the $C_4$-$C_8$-alcohols, particularly of butanol, hexanol, octanol, and 2-ethylhexanol, polymethyl methacrylate (PMMA), methyl methacrylate-butyl acrylate copolymers, acrylonitrile-butadiene-styrene copolymers (ABSs), ethylene-propylene copolymers, ethylene-propylene-diene copolymers (EPDMs), polystyrene (PS), styrene-acrylonitrile copolymers (SANs), acrylonitrile-styrene-acrylate (ASA), styrene-butadiene-methyl methacrylate copolymers (SBMMAs), styrene-maleic anhydride copolymers, styrene-methacrylic acid copolymers (SMAs), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP), and cellulose acetate/butyrate (CAB).

It is preferable that the at least one thermoplastic polymer contained in the molding composition of the invention is polyvinyl chloride (PVC), polyvinyl butyral (PVB), homo- and copolymers of vinyl acetate, homo- and copolymers of styrene, or is polyacrylates, thermoplastic polyurethanes (TPUs), or polysulfides.

The amounts of plasticizer used differ in accordance with the thermoplastic non-PVC polymer or thermoplastic non-PVC polymer mixture comprised in the molding composition of the invention. The total amount of the plasticizer composition of the present invention, as defined above, in the non-PVC molding composition is generally in the range from 0.5 to 300 phr (parts per hundred resin=parts by weight per hundred parts by weight of polymer), preferable in the range from 1.0 to 130 phr, particularly preferable in the range from 2.0 to 100 phr.

Specifically, the at least one thermoplastic polymer contained in the molding composition of the invention is polyvinyl chloride (PVC).

Polyvinyl chloride is obtained via homopolymerization of vinyl chloride. The polyvinyl chloride (PVC) used in the invention can by way of example be produced via suspension polymerization, microsuspension polymerization, emulsion polymerization, or bulk polymerization. The production of PVC via polymerization of vinyl chloride, and also the production and composition of plasticized PVC, are described by way of example in "Becker/Braun, Kunststoff-Handbuch" [Plastics Handbook], vol. 2/1: Polyvinylchlorid [Polyvinyl chloride], 2nd edn., Carl Hanser Verlag, Munich.

The K value, which characterizes the molar mass of the PVC and is determined in accordance with DIN 53726, is mostly in the range from 57 to 90 for the PVC plasticized in the invention, preferably in the range from 61 to 85, in particular in the range from 64 to 80.

For the purposes of the invention, the content (% by weight) of PVC in the molding compositions of the invention is in the range from 20 to 95%, preferably in the range from 40 to 90%, particularly preferable in the range from 45 to 85%.

If the thermoplastic polymer in the molding compositions of the invention is polyvinyl chloride, the total amount of the plasticizer composition of the present invention, as defined above, in the molding composition is in the range from 5 to 300 phr, preferable in the range from 15 to 150 phr, and in particular in the range from 30 to 120 phr.

The present invention further provides molding compositions comprising an elastomer and a plasticizer composition according to the invention.

The elastomer present in the molding compositions of the invention may be a natural rubber (NR), or a synthetic rubber, or a mixture thereof. Examples of preferred synthetic rubbers are polyisoprene rubber (IR), styrene-butadiene rubber (SBR), butadiene rubber (BR), nitrile-butadiene rubber (NBR) and chloroprene rubber (CR).

Preference is given to rubbers or rubber mixtures which can be vulcanized by sulfur.

For the purposes of the invention, the content of elastomer in the molding compositions of the invention is from 20 to 95 wt. %, preferable from 45 to 90 wt. % an in particular from 50 to 85 wt. %, based on the total weight of the molding composition.

For the purposes of the invention, the molding compositions which comprise an elastomer can comprise other suitable additives, in addition to the above constituents. By way of example, the materials may comprise reinforcing fillers, such as carbon black or silicon dioxide, other fillers, such as phenolic resins, a vulcanizing agent or crosslinking agent, a vulcanizing accelerator or crosslinking accelerator, activators, various types of oil, antioxidants, and other various additives which by way of example can be mixed into tire compositions and into other rubber compositions.

If the polymer in the molding compositions of the invention comprises elastomers, especially rubbers, the total amount of the plasticizer composition of the present invention, as defined above, in the molding composition is in the range from 1.0 to 60 phr, preferable in the range from 2.0 to 40 phr, particularly preferable in the range from 3.0 to 30 phr.

Additionally, the polymer in the molding composition may be a mixture of PVC and an elastomer. Regarding suitable and preferred elastomers that can be used in these polymer mixtures, reference is made to the above-mentioned explanations. The amount of elastomer in these polymer mixtures is typically from 1 to 50 wt. %, preferably from 3 to 40 wt. %, in particular from 5 to 30 wt. %.

Depending on how large the fraction of the elastomer in the polymer mixture is, the amount of the plasticizer composition of the invention in these molding compositions that is necessary to achieve the desired properties may vary strongly.

The total content of the plasticizer composition of the invention in these molding compositions is typically in the range of 0.5 to 300 phr, preferably in the range of 1.0 to 150 phr, more preferably in the range of 2.0 to 120 phr.

Molding Composition Additives

For the purposes of the invention, the molding compositions comprising at least one thermoplastic polymer can comprise other suitable additives. By way of example, the materials can comprise lubricants, fillers, pigments, flame retardants, light stabilizers and other stabilizers, blowing agents, polymeric processing aids, impact modifiers, optical brighteners, antistatic agents, or biostabilizers.

Some suitable additives are described in more detail below. However, the examples listed do not represent any restriction of the molding compositions of the invention, but instead serve merely for illustration. All data relating to content are in % by weight, based on the entire molding composition.

Stabilizers that can be used are any of the conventional PVC stabilizers in solid and liquid form, for example conventional Ca/Zn, Ba/Zn, Pb, or Sn stabilizers, and also acid-binding layered silicates.

The molding compositions of the invention can have from 0.05 to 7% content of stabilizers, preferably from 0.1 to 5%, particularly preferably from 0.2 to 4%, and in particular from 0.5 to 3%.

Lubricants reduce the adhesive force between the polymers to be processed and the metal surfaces, and serve to counteract frictional forces during mixing, plastification and deformation.

The molding compositions of the invention can comprise, as lubricants, any of the lubricants conventionally used for the processing of plastics. Examples of those that can be used are hydrocarbons, such as oils, paraffins, and PE waxes, fatty alcohols having from 6 to 20 carbon atoms, ketones, carboxylic acids, such as fatty acids and montanic acid, oxidized PE wax, metal salts of carboxylic acids, carboxamides, and also carboxylic esters, for example with the following alcohols: ethanol, fatty alcohols, glycerol, ethanediol, and pentaerythritol, and with long-chain carboxylic acids as acid component.

The molding compositions of the invention can have from 0.01 to 10% lubricant content, preferably from 0.05 to 5%, particularly preferably from 0.1 to 3%, and in particular from 0.2 to 2%.

Fillers have an advantageous effect primarily on the compressive strength, tensile strength, and flexural strength, and also the hardness and heat resistance, of plasticized PVC.

For the purposes of the invention, the molding compositions can also comprise fillers such as carbon black and other organic fillers such as natural calcium carbonates, for example chalk, limestone, and marble, dolomite, silicates, silica, sand, and diatomaceous earth, aluminum silicates, such as kaolin, mica, and feldspar, and synthetic calcium carbonates. It is preferable to use the following as fillers: calcium carbonates, chalk, dolomite, kaolin, silicates, talc powder, or carbon black.

The molding compositions of the invention can have from 0.01 to 80% content of fillers, preferably from 0.1 to 60%, particularly preferably from 0.5 to 50%, and in particular from 1 to 40%.

The molding compositions of the invention can also comprise pigments in order to adapt the resultant product to be appropriate to various possible uses.

For the purposes of the present invention, it is possible to use either inorganic pigments or organic pigments. Examples of inorganic pigments that can be used are cobalt pigments, such as $CoO/Al_2O_3$, and chromium pigments, such as $Cr_2O_3$. Examples of organic pigments that can be used are monoazo pigments, condensed azo pigments, azomethine pigments, anthraquinone pigments, quinacridones, phthalocyanine pigments and dioxazine pigments.

The molding compositions of the invention can have from 0.01 to 10% content of pigments, preferably from 0.05 to 5%, particularly preferably from 0.1 to 3%, and in particular from 0.5 to 2%.

In order to reduce flammability and to reduce smoke generation during combustion, the molding compositions of the invention can also comprise flame retardants.

Examples of flame retardants that can be used are antimony trioxide, phosphate esters, chloroparaffin, aluminum hydroxide and boron compounds.

The molding compositions of the invention can have from 0.01 to 10% content of flame retardants, preferably from 0.1 to 8%, particularly preferably from 0.2 to 5%, and in particular from 0.5 to 2%.

The molding compositions can also comprise light stabilizers, e.g. UV-absorbers, in order to protect items produced from the molding compositions of the invention from surface damage due to the effect of light.

For the purposes of the present invention it is possible by way of example to use as light stabilizers hydroxybenzophenones, hydroxyphenylbenzotriazoles, cyanoacrylates or hindered aminine light stabilizers (HALS), such as derivatives of 2,2,6,6-tetramethyl piperidine.

The molding compositions of the invention can have from 0.01 to 7% content of light stabilizers, e.g. UV-absorbers, preferably from 0.1 to 5%, particularly preferably from 0.2 to 4%, and in particular from 0.5 to 3%.

Production of the Compounds of the General Formula (I.a) and (I.b)

The production of the compounds of the general formula (I.a) and (I.b) is described below.

The raw materials for the manufacture of the compounds of the general formula (I.a) and (I.b) are commercially available. For example, cyclohexanol is available from BASF SE, Ludwigshafen, Germany, and 2-ethylsuccinic acid is available from Solvay SA, Brussels, Belgium.

2-Ethylsuccinic, 2-methylglutaric acid and adipic acid can conventionally be prepared via hydroxycarbonylation of pentenoic acid, as for example described in U.S. Pat. No. 6,372,942.

Esterification

The ester compounds of the general formula (I.a) and (I.b) can be produced via esterification of 2-methylsuccinic acid, 2-ethylsuccinic acid, 2-methylglutaric acid, 2-ethylglutaric acid or adipic acid, in particular 2-methylglutaric acid, 2-ethylsuccinic acid, adipic acid or suitable derivatives thereof with the corresponding aliphatic alcohols. Examples of suitable derivatives of the dicarboxylic acids are the acyl halides and anhydrides. A preferred acyl halide is the acyl chloride. Preferably, 2-methylglutaric acid, 2-ethylsuccinic acid, adipic acid, and mixtures thereof, as defined above, are used as the dicarboxylic acid starting material. The esterification can be conducted according to conventional processes known to the person skilled in the art. Among these are the reaction of at least one alcohol component selected from the alcohols $R^1$—OH and, respectively, $R^2$—OH with the aforementioned dicarboxylic acid starting material, as for example in analogy to the esterification reaction process described in US 2010/0292121. Esterification catalysts that can be used are the catalysts conventionally used for this purpose, e.g. mineral acids, such as sulfuric acid and phosphoric acid, amphoteric catalysts, in particular titanium compounds, tin(IV) compounds, or zirconium compounds, e.g. tetraalkoxytitanium compounds, e.g. tetrabutoxytitanium, and tin(IV) oxide. The water produced during the reaction can be removed by conventional measures, e.g. by distillation. WO 02/38531 describes a process for producing esters of multibasic carboxylic acids where a) a mixture consisting essentially of the acid component or of an anhydride thereof and of the alcohol component is heated to boiling point in the presence of an esterification catalyst in a reaction zone, b) the vapors comprising alcohol and water are fractionated to give an alcohol-rich fraction and a water-rich fraction, c) the alcohol-rich fraction is returned to the reaction zone, and the water-rich fraction is discharged from the process.

An effective amount of the esterification catalyst is used and is usually in the range from 0.05 to 10% by weight, preferably from 0.1 to 5% by weight, based on the entirety of acid component (or anhydride) and alcohol component.

Further processes that are useful for the preparation of the compounds of the general formula (I.a) and (I.b) via esterification are e.g. disclosed by U.S. Pat. No. 6,310,235, DE-A 2612355 or DE-A 1945359. The entirety of the documents mentioned is incorporated herein by way of reference.

In general, the esterification of 2-methylsuccinic acid, 2-ethylsuccinic acid, 2-methylglutaric acid, 2-ethylglutaric acid, adipic acid or suitable derivatives thereof, in particular 2-methylglutaric acid, 2-ethylsuccinic acid, adipic acid or mixtures thereof, as defined above, is preferably carried out in the presence of the alcohol components $R^1$—OH and/or $R^2$—OH, as described above, by means of an organic acid or mineral acid, in particular concentrated sulfuric acid. The amount used of the alcohol component here is advantageously at least twice the stoichiometric amount, based on the total amount of dicarboxylic acids or the suitable derivatives thereof in the reaction mixture.

The esterification can generally take place at ambient pressure or at reduced or elevated pressure. It is preferable that the esterification is carried out at ambient pressure or reduced pressure.

The esterification can be carried out in the absence of any added solvent or in the presence of an organic solvent.

If the esterification is carried out in the presence of a solvent, it is preferable that this is an organic solvent that is inert under the reaction conditions. Among these are by way of example aliphatic hydrocarbons, halogenated aliphatic hydrocarbons, and aromatic and substituted aromatic hydrocarbons and ethers. It is preferable that the solvent is one selected from pentane, hexane, heptane, ligroin, petroleum ether, cyclohexane, dichloromethane, trichloromethane, tetrachloromethane, benzene, toluene, xylene, chlorobenzene, dichlorobenzenes, dibutyl ether, THF, dioxane, and mixtures thereof.

The esterification is usually carried out in a temperature range from 50 to 250° C.

If the esterification catalyst is selected from organic acids or mineral acids, the esterification is usually carried out in the temperature range from 50 to 160° C.

If the esterification catalyst is selected from amphoteric catalysts, the esterification is usually carried out in the temperature range from 100 to 250° C.

The esterification can take place in the absence of or in the presence of an inert gas. The expression inert gas generally means a gas which under the prevailing reaction conditions does not enter into any reactions with the starting materials, reagents, or solvents participating in the reaction, or with the resultant products. It is preferable that the esterification takes place without addition of any inert gas.

Transesterification:

The ester compounds of the general formula (I.a) and (I.b) can be produced via transesterification of esters of 2-methylsuccinic acid, 2-ethylsuccinic acid, 2-methylglutaric acid, 2-ethylglutaric acid or adipic acid, in particular esters of 2-methylglutaric acid, 2-ethylsuccinic acid, adipic acid or mixtures thereof, as defined above, which differ from compounds (I.a) and (I.b), with the corresponding aliphatic alcohols. The transesterification can be conducted according to conventional processes known to the person skilled in the art. Among these are the reaction of the di($C_1$-$C_2$)-alkyl esters of 2-methylsuccinic acid, 2-ethylsuccinic acid, 2-methylglutaric acid, 2-ethylglutaric acid or adipic acid, in particular the di($C_1$-$C_2$)-alkyl esters of 2-methylglutaric acid, 2-ethylsuccinic acid or adipic acid as well as di($C_1$-$C_2$)-alkyl esters of mixtures of these dicarboxylic acids, as defined above, with at least one alcohol component selected from the alcohols $R^1$—OH and, respectively, $R^2$—OH or a mixture thereof in the presence of a suitable transesterification catalyst.

Transesterification catalysts that can be used are the conventional catalysts usually used for transesterification reactions, where these are mostly also used in esterification reactions. Among these are by way of example mineral acids, such as sulfuric acid and phosphoric acid, and specific metal catalysts from the group of the tin(IV) catalysts, for example dialkyltin dicarboxylates, such as dibutyltin diacetate, trialkyltin alkoxides, monoalkyltin compounds, such as monobutyltin dioxide, tin salts, such as tin acetate, or tin oxides; from the group of the titanium catalysts: monomeric and polymeric titanates and titanium chelates, for example tetraethyl orthotitanate, tetrapropyl orthotitanate, tetrabutyl orthotitanate, triethanolamine titanate; from the group of the zirconium catalysts: zirconates and zirconium chelates, for example tetrapropyl zirconate, tetrabutyl zirconate, triethanolamine zirconate; and also lithium catalysts, such as lithium salts, lithium alkoxides; and aluminum(III) acetylacetonate, chromium(III) acetylacetonate, iron(III) acetylacetonate, cobalt(II) acetylacetonate, nickel(II) acetylacetonate, and zinc(II) acetylacetonate.

The amount of transesterification catalyst used is from 0.05 to 5% by weight, preferably from 0.1 to 1% by weight. The reaction mixture is preferably heated to the boiling point of the reaction mixture, the reaction temperature therefore being from 20° C. to 200° C., depending on the reactants.

The transesterification can take place at ambient pressure or at reduced or elevated pressure. It is preferable that the transesterification is carried out at a pressure in the range from 0.001 to 200 bar, particularly in the range from 0.01 to 5 bar. The relatively low-boiling-point alcohol eliminated during the transesterification is preferably continuously removed by distillation in order to shift the equilibrium of the transesterification reaction. The distillation column necessary for this purpose generally has direct connection to the transesterification reactor, and it is preferable that said column is a direct attachment thereto. If a plurality of transesterification reactors are used in series, each of said reactors can have a distillation column, or the vaporized alcohol mixture can preferably be introduced into a distillation column from the final tanks of the transesterification reactor cascade by way of one or more collection lines. The relatively high-boiling-point alcohol reclaimed in said distillation is preferably returned to the transesterification.

If an amphoteric catalyst is used, this is generally removed via hydrolysis and subsequent removal of the resultant metal oxide, e.g. via filtration. It is preferable that, after reaction has been completed, the catalyst is hydrolyzed by means of washing with water, and the precipitated metal oxide is removed by filtration. The filtrate can, if desired, be subjected to further work-up for the isolation and/or purification of the product. It is preferable that the product is isolated by distillation.

The transesterification can be carried out in the absence of, or in the presence of, an added organic solvent. It is preferable that the transesterification is carried out in the presence of an inert organic solvent. Suitable organic solvents are those mentioned above for the esterification. Among these are specifically toluene and THF.

The transesterification is preferably carried out in the temperature range from 50 to 200° C.

The transesterification can take place in the absence of or in the presence of an inert gas. The expression inert gas generally means a gas which under the prevailing reaction conditions does not enter into any reactions with the starting materials, reagents, or solvents participating in the reaction, or with the resultant products. It is preferable that the transesterification takes place without addition of any inert gas.

As mentioned above, the dicarboxylic acids or the suitable derivatives thereof, respectively, and the alcohols $R^1$—OH and/or $R^2$—OH, that are used for the preparation of the compounds (I.a) and (I.b) can either be purchased or produced by processes described in the prior art, e.g. in U.S. Pat. No. 6,372,942.

Suitable alcohols $R^1$—OH and/or $R^2$—OH which are used for the production of the compounds (I.a) and (I.b) contained in the plasticizer composition are selected from $C_5$-$C_7$-cycloalkanols optionally substituted by $C_1$-$C_{10}$-alkyl. Preferable alcohols $R^1$—OH and/or $R^2$—OH, respectively, are selected from cyclopentanol, cyclohexanol and cycloheptanol.

Compounds of the General Formula (II)

The compounds of the general formula (II) can either be purchased or produced by processes known in the prior art.

The 1,2-cyclohexanedicarboxylic esters are generally obtained mostly via ring-hydrogenation of the corresponding phthalic esters. The ring-hydrogenation can take place as mentioned above by the process described in WO 99/32427. A particularly suitable ring-hydrogenation process is also described by way of example in WO 2011082991 A2.

1,2-Cyclohexanedicarboxylic esters can moreover be obtained via esterification of 1,2-cyclohexanedicarboxylic acid or of suitable derivatives thereof with the corresponding alcohols. The esterification can take place by conventional processes known to the person skilled in the art.

A feature common to the processes for the production of the compounds of the general formula (II) is that, starting from phthalic acid, 1,2-cyclohexanedicarboxylic acid, or suitable derivatives thereof, an esterification or transesterification reaction is carried out, where the corresponding $C_7$-$C_{12}$-alkanols are used as starting materials. These alcohols are generally not pure substances, instead being isomer mixtures of which the composition and purity depends on the particular process by which they are prepared. Preferred $C_7$-$C_{12}$-alkanols which are used for the production of the compounds (II) contained in the plasticizer composition of the invention can be straight-chain or branched, or can be composed of mixtures of straight-chain and branched $C_7$-$C_{12}$-alkanols. Among these are n-heptanol, isoheptanol, n-octanol, isooctanol, 2-ethyihexanol, n-nonanol, isononanol, isodecanol, 2-propylheptanol, n-undecanol, isoundecanol, n-dodecanol, and isododecanol. Particularly preferred $C_7$-$C_{12}$-alkanols are 2-ethylhexanol, isononanol, and 2-propylheptanol, in particular isononanol.

Heptanol

The heptanols used for the production of the compounds of the general formula (II) can be straight-chain or branched or can be composed of mixtures of straight-chain and branched heptanols. It is preferable to use mixtures of branched heptanols, also known as isoheptanol, which are produced via rhodium- or preferably cobalt-catalyzed hydroformylation of propene dimer, obtainable by way of example by the Dimersol® process, and subsequent hydrogenation of the resultant isoheptanals to give an isoheptanol mixture. Because of the process used for its production, the resultant isoheptanol mixture is composed of a plurality of isomers. Substantially straight-chain heptanols can be obtained via rhodium- or preferably cobalt-catalyzed hydroformylation of 1-hexene and subsequent hydrogenation of the resultant n-heptanal to give n-heptanol. The hydroformylation of 1-hexene or of propene dimer can be achieved by methods known per se: compounds used as catalyst in hydroformylation with rhodium catalysts homogeneously dissolved in the reaction medium can be not only uncomplexed rhodium carbonyl compounds which are formed in situ under the conditions of the hydroformylation reaction within the hydroformylation reaction mixture on exposure to synthesis gas, e.g. from rhodium salts, but also complex rhodium carbonyl compounds, in particular complexes with organic phosphines, such as triphenylphosphine, or with organophosphites, preferably chelating biphosphites, as described by way of example in U.S. Pat. No. 5,288,918. Compounds used in the cobalt-catalyzed hydroformylation of these olefins are generally cobalt carbonyl compounds which are homogeneously soluble in the reaction mixture and which are formed in situ from cobalt salts under the conditions of the hydroformylation reaction on exposure to synthesis gas. If the cobalt-catalyzed hydroformylation is carried out in the presence of trialkyl- or triarylphosphines, the desired heptanols are formed directly as hydroformylation product, and there is therefore then no need for further hydrogenation of the aldehyde function.

Examples of suitable processes for the cobalt-catalyzed hydroformylation of 1-hexene or of the hexene isomer mixtures are the established industrial processes explained on pages 162-168 of Falbe, New Syntheses with Carbon Monoxide, Springer, Berlin, 1980, an example being the Ruhrchemie process, the BASF process, the Kuhlmann process, or the Shell process. Whereas the Ruhrchemie, BASF, and Kuhlmann process operate with non-ligand-modified cobalt carbonyl compounds as catalysts and thus give hexanal mixtures, the Shell process (DE-A 1593368) uses, as catalyst, phosphine- or phosphite-ligand-modified cobalt carbonyl compounds which lead directly to the hexanol mixtures because they also have high hydrogenation activity. DE-A 2139630, DE-A 2244373, DE-A 2404855, and WO 01014297 provide detailed descriptions of advantageous embodiments for the conduct of the hydroformylation with non-ligand-modified cobalt carbonyl complexes.

The rhodium-catalyzed hydroformylation of 1-hexene or of the hexene isomer mixtures can use the established industrial low-pressure rhodium hydroformylation process with triphenylphosphine-ligand-modified rhodium carbonyl compounds, which is subject matter of U.S. Pat. No. 4,148,830. Non-ligand-modified rhodium carbonyl compounds can serve advantageously as catalyst for the rhodium-catalyzed hydroformylation of long-chain olefins, for example of the hexene isomer mixtures obtained by the processes described above; this differs from the low-pressure process in requiring a higher pressure of from 80 to 400 bar. The conduct of high-pressure rhodium hydroformylation processes of this type is described by way of example in EP-A 695734, EP-B 880494, and EP-B 1047655.

The isoheptanal mixtures obtained after hydroformylation of the hexene isomer mixtures are catalytically hydrogenated in a manner that is per se conventional to give isoheptanol mixtures. For this purpose it is preferable to use heterogeneous catalysts which comprise, as catalytically active component, metals and/or metal oxides of groups VI to VIII, or else of transition group I, of the Periodic Table of the Elements, in particular chromium, molybdenum, manganese, rhenium, iron, cobalt, nickel, and/or copper, optionally deposited on a support material, such as $Al_2O_3$, $SiO_2$ and/or $TiO_2$. Catalysts of this type are described by way of example in DE-A 3228881, DE-A 2628987, and DE-A 2445303. It is particularly advantageous to carry out the hydrogenation of the isoheptanals with an excess of hydrogen of from 1.5 to 20% above the stoichiometric amount of hydrogen needed for the hydrogenation of the isoheptanals, at temperatures of from 50 to 200° C., and at a hydrogen pressure of from 25 to 350 bar, and for avoidance of side-reactions to add, during the course of the hydrogenation, in accordance with DE-A 2628987, a small amount of water, advantageously in the form of an aqueous solution of an alkali metal hydroxide or alkali metal carbonate, in accordance with the teaching of WO 01087809.

Octanol

For many years, 2-ethylhexanol was the largest-production-quantity plasticizer alcohol, and it can be obtained through the aldol condensation of n-butyraldehyde to give 2-ethylhexanal and subsequent hydrogenation thereof to give 2-ethylhexanol (see Ullmann's Encyclopedia of Industrial Chemistry; 5th edition, vol. A 10, pp. 137-140, VCH Verlagsgesellschaft GmbH, Weinheim 1987).

Substantially straight-chain octanols can be obtained via rhodium- or preferably cobalt-catalyzed hydroformylation of 1-heptene and subsequent hydrogenation of the resultant n-octanal to give n-octanol. The 1-heptene needed for this purpose can be obtained from the Fischer-Tropsch synthesis of hydrocarbons.

By virtue of the production route used for the alcohol isooctanol, it is not a unitary chemical compound, in contrast to 2-ethylhexanol or n-octanol, but instead is an isomer mixture of variously branched $C_8$-alcohols, for example of 2,3-dimethyl-1-hexanol, 3,5-dimethyl-1-hexanol, 4,5-dimethyl-1-hexanol, 3-methyl-1-heptanol, and 5-methyl-1-heptanol; these can be present in the isooctanol in various quantitative proportions which depend on the production conditions and production processes used. Isooctanol is usually produced via codimerization of propene with butenes, preferably n-butenes, and subsequent hydroformylation of the resultant mixture of heptene isomers. The octanal isomer mixture obtained in the hydroformylation can subsequently be hydrogenated to give the isooctanol in a manner that is conventional per se.

The codimerization of propene with butenes to give isomeric heptenes can advantageously be achieved with the aid of the homogeneously catalyzed Dimersol® process (Chauvin et al; Chem. Ind.; May 1974, pp. 375-378), which uses, as catalyst, a soluble nickel phosphine complex in the presence of an ethylaluminum chlorine compound, for example ethylaluminum dichloride. Examples of phosphine ligands that can be used for the nickel complex catalyst are tributylphosphine, triisopropyl-phosphine, tricyclohexyl-phosphine, and/or tribenzylphosphine. The reaction takes place at temperatures of from 0 to 80° C., and it is advantageous here to set a pressure at which the olefins are present in solution in the liquid reaction mixture (Cornils; Hermann: Applied Homogeneous Catalysis with Organometallic Compounds; $2^{nd}$ edition, vol. 1; pp. 254-259, Wiley-VCH, Weinheim 2002).

In an alternative to the Dimersol® process operated with nickel catalysts homogeneously dissolved in the reaction medium, the codimerization of propene with butenes can also be carried out with a heterogeneous NiO catalyst deposited on a support; heptene isomer distributions obtained here are similar to those obtained in the homogeneously catalyzed process. Catalysts of this type are by way of example used in what is known as the Octol® process (Hydrocarbon Processing, February 1986, pp. 31-33), and a specific heterogeneous nickel catalyst with good suitability for olefin dimerization or olefin codimerization is disclosed by way of example in WO 9514647.

Codimerization of propene with butenes can also use, instead of nickel-based catalysts, heterogeneous Brønsted-acid catalysts; heptenes obtained here are generally more highly branched than in the nickel-catalyzed processes. Examples of catalysts suitable for this purpose are solid phosphoric acid catalysts, e.g. phosphoric-acid-impregnated kieselguhr or diatomaceous earth, these being as utilized in the PolyGas® process for olefin dimerization or olefin oligomerization (Chitnis et al; Hydrocarbon Engineering 10, No. 6-June 2005). Brønsted-acid catalysts that have very good suitability for the codimerization of propene and butenes to give heptenes are zeolites, which are used in the EMOGAS® process, a further development based on the PolyGas® process.

The 1-heptene and the heptene isomer mixtures are converted to n-octanal and, respectively, octanal isomer mixtures by the known processes explained above in connection with the production of n-heptanal and heptanal isomer mixtures, by means of rhodium- or cobalt-catalyzed hydroformylation, preferably cobalt-catalyzed hydroformylation. These are then hydrogenated to give the corresponding octanols, for example by means of one of the catalysts mentioned above in connection with production of n-heptanol and of isoheptanol.

Nonanol

Substantially straight-chain nonanol can be obtained via rhodium- or preferably cobalt-catalyzed hydroformylation of 1-octene and subsequent hydrogenation of the resultant n-nonanal. The starting olefin 1-octene can be obtained by way of example by way of ethylene oligomerization by means of a nickel complex catalyst that is homogenously soluble in the reaction medium—1,4-butanediol—with, for example, diphenyl-phosphinoacetic acid or 2-diphenylphosphinobenzoic acid as ligand. This process is also known as the Shell Higher Olefins Process or SHOP process (see Weisermel, Arpe: Industrielle Organische Chemie [Industrial organic chemistry]; $5^{th}$ edition, p. 96; Wiley-VCH, Weinheim 1998).

Isononanol used for the synthesis of the diisononyl esters of general formula (II) comprised in the plasticizer composition of the invention is not a unitary chemical compound, but instead is a mixture of variously branched, isomeric $C_9$-alcohols which can have various degrees of branching depending on the manner in which they were produced, and also in particular on the starting materials used. The isononanols are generally produced via dimerization of butenes to give isooctene mixtures, subsequent hydroformylation of the isooctene mixtures, and hydrogenation of the resultant isononanal mixtures to give isononanol mixtures, as explained in Ullmann's Encyclopedia of Industrial Chemistry, $5^{th}$ edition, vol. A1, pp. 291-292, VCH Verlagsgesellschaft GmbH, Weinheim 1995.

Isobutene, cis- and trans-2-butene, and also 1-butene, or a mixture of these butene isomers, can be used as starting material for the production of the isononanols. The dimerization of pure isobutene, mainly catalyzed by means of liquid Brønsted acids, e.g. sulfuric acid or phosphoric acid, or by means of solid Brønsted acids, e.g. phosphoric acid applied to kieselguhr, $SiO_2$, or $Al_2O_3$, as support material, or zeolites, mainly gives the highly branched compound 2,4,4-trimethylpentene, also termed diisobutylene, which gives highly branched isononanols after hydroformylation and hydrogenation of the aldehyde.

Preference is given to isononanols with a low degree of branching. Isononanol mixtures of this type with little branching are prepared from the linear butenes 1-butene, cis- and/or trans-2-butene, which optionally can also comprise relatively small amounts of isobutene, by way of the route described above involving butene dimerization, hydroformylation of the isooctene, and hydrogenation of the resultant isononanal mixtures. A preferred raw material is what is known as raffinate II, which is obtained from the $C_4$-cut of a cracker, for example of a steam cracker, after elimination of allenes, acetylenes, and dienes, in particular 1,3-butadiene, via partial hydrogenation thereof to give linear butenes, or removal thereof via extractive distillation, for example by means of N-methylpyrrolidone, and subsequent Brønsted-acid catalyzed removal of the isobutene comprised therein via reaction thereof with methanol or isobutanol by established large-scale-industrial processes with formation of the fuel additive methyl tert-butyl ether (MTBE), or of the isobutyl tert-butyl ether that is used to obtain pure isobutene.

Raffinate II also comprises, alongside 1-butene and cis- and trans-2-butene, n- and isobutane, and residual amounts of up to 5% by weight of isobutene.

The dimerization of the linear butenes or of the butene mixture comprised in raffinate II can be carried out by means of the familiar processes used on a large industrial scale, for example those explained above in connection with the production of isoheptene mixtures, for example by means of heterogeneous, Brønsted-acid catalysts such as those used in the PolyGas® process or EMOGAS® process, by means of the Dimersol® process with use of nickel complex catalysts homogeneously dissolved in the reaction medium, or by means of heterogeneous, nickel(II)-oxide-containing catalysts by the Octol® process or by the process of WO 9514647. The resultant isooctene mixtures are converted to isononanal mixtures by the known processes explained above in connection with the production of heptanal isomer mixtures, by means of rhodium or cobalt-catalyzed hydroformylation, preferably cobalt-catalyzed hydroformylation. These are then hydrogenated to give the suitable isononanol mixtures, for example by means of one of the catalysts mentioned above in connection with the production of isoheptanol.

The resultant isononanol isomer mixtures can be characterized by way of their iso-index, which can be calculated from the degree of branching of the individual, isomeric isononanol components in the isononanol mixture multiplied by the percentage proportion of these in the isononanol mixture: by way of example, n-nonanol contributes the value 0 to the iso-index of an isononanol mixture, methyloctanols (single branching) contribute the value 1, and dimethylheptanols (double branching) contribute the value 2. The higher the linearity, the lower is the iso-index of the relevant isononanol mixture. Accordingly, the iso-index of an isononanol mixture can be determined via gas-chromatographic separation of the isononanol mixture into its individual isomers and attendant quantification of the percentage quantitative proportion of these in the isononanol mixture, determined by standard methods of gas-chromatographic analysis. In order to increase the volatility of the isomeric nonanols and improve the gas-chromatographic separation of these, they are advantageously trimethylsilylated by means of standard methods, for example via reaction with N-methyl-N-trimethylsilyltrifluoracetamide, prior to gas-chromatographic analysis. In order to achieve maximum quality of separation of the individual components during gas-chromatographic analysis, it is preferable to use capillary columns with polydimethylsiloxane as stationary phase. Capillary columns of this type are obtainable commercially, and a little routine experimentation by the person skilled in the art is all that is needed in order to select, from the many different products available commercially, one that has ideal suitability for this separation task.

The diisononyl esters of the general formula (II) used in the plasticizer composition of the invention have generally been esterified with isononanols with an iso index of from 0.8 to 2, preferably from 1.0 to 1.8, and particularly preferably from 1.1 to 1.5, which can be produced by the abovementioned processes.

Possible compositions of isononanol mixtures that can be used for the production of the compounds of the general formula (II) of the invention are stated below merely by way of example, and it should be noted here that the proportions of the isomers individually listed within the isononanol mixture can vary, depending on the composition of starting material, for example raffinate II, the composition of butenes in which can vary with the production process, and on variations in the production conditions used, for example the age of the catalysts utilized, and conditions of temperature and of pressure, which have to be adjusted appropriately thereto.

By way of example, an isononanol mixture produced via cobalt-catalyzed hydroformylation and subsequent hydrogenation from an isooctene mixture produced with use of raffinate II as raw material by means of the catalyst and process in accordance with WO 9514647 can have the following composition:

- from 1.73 to 3.73% by weight, preferably from 1.93 to 3.53% by weight, particularly preferably from 2.23 to 3.23% by weight of 3-ethyl-6-methyl-hexanol;
- from 0.38 to 1.38% by weight, preferably from 0.48 to 1.28% by weight, particularly preferably from 0.58 to 1.18% by weight of 2,6-dimethylheptanol;
- from 2.78 to 4.78% by weight, preferably from 2.98 to 4.58% by weight, particularly preferably from 3.28 to 4.28% by weight of 3,5-dimethylheptanol;
- from 6.30 to 16.30% by weight, preferably from 7.30 to 15.30% by weight, particularly preferably from 8.30 to 14.30% by weight of 3,6-dimethylheptanol;
- from 5.74 to 11.74% by weight, preferably from 6.24 to 11.24% by weight, particularly preferably from 6.74 to 10.74% by weight of 4,6-dimethylheptanol;
- from 1.64 to 3.64% by weight, preferably from 1.84 to 3.44% by weight, particularly preferably from 2.14 to 3.14% by weight of 3,4,5-trimethylhexanol;
- from 1.47 to 5.47% by weight, preferably from 1.97 to 4.97% by weight, particularly preferably from 2.47 to 4.47% by weight of 3,4,5-trimethylhexanol, 3-methyl-4-ethylhexanol and 3-ethyl-4-methylhexanol;
- from 4.00 to 10.00% by weight, preferably from 4.50 to 9.50% by weight, particularly preferably from 5.00 to 9.00% by weight of 3,4-dimethylheptanol;
- from 0.99 to 2.99% by weight, preferably from 1.19 to 2.79% by weight, particularly preferably from 1.49 to 2.49% by weight of 4-ethyl-5-methylhexanol and 3-ethylheptanol;
- from 2.45 to 8.45% by weight, preferably from 2.95 to 7.95% by weight, particularly preferably from 3.45 to 7.45% by weight of 4,5-dimethylheptanol and 3-methyloctanol;
- from 1.21 to 5.21% by weight, preferably from 1.71 to 4.71% by weight, particularly preferably from 2.21 to 4.21% by weight of 4,5-dimethylheptanol;
- from 1.55 to 5.55% by weight, preferably from 2.05 to 5.05% by weight, particularly preferably from 2.55 to 4.55% by weight of 5,6-dimethylheptanol;
- from 1.63 to 3.63% by weight, preferably from 1.83 to 3.43% by weight, particularly preferably from 2.13 to 3.13% by weight of 4-methyloctanol;
- from 0.98 to 2.98% by weight, preferably from 1.18 to 2.78% by weight, particularly preferably from 1.48 to 2.48% by weight of 5-methyloctanol;
- from 0.70 to 2.70% by weight, preferably from 0.90 to 2.50% by weight, particularly preferably from 1.20 to 2.20% by weight of 3,6,6-trimethylhexanol;
- from 1.96 to 3.96% by weight, preferably from 2,16 to 3.76% by weight, particularly preferably from 2.46 to 3.46% by weight of 7-methyloctanol;
- from 1.24 to 3.24% by weight, preferably from 1.44 to 3.04% by weight, particularly preferably from 1.74 to 2.74% by weight of 6-methyloctanol;
- from 0.1 to 3% by weight, preferably from 0.2 to 2% by weight, particularly preferably from 0.3 to 1% by weight of n-nonanol;
- from 25 to 35% by weight, preferably from 28 to 33% by weight, particularly preferably from 29 to 32% by weight of other alcohols having 9 and 10 carbon atoms; with the proviso that the entirety of the components mentioned gives 100% by weight.

In accordance with what has been said above, an isononanol mixture produced via cobalt-catalyzed hydroformylation and subsequent hydrogenation with use of an isooctene mixture produced by means of the PolyGas® process or EMOGAS® process with an ethylene-containing butene mixture as raw material can vary within the range of the compositions below, depending on the composition of the raw material and variations in the reaction conditions used:

- from 6.0 to 16.0% by weight, preferably from 7.0 to 15.0% by weight, particularly preferably from 8.0 to 14.0% by weight of n-nonanol;
- from 12.8 to 28.8% by weight, preferably from 14.8 to 26.8% by weight, particularly preferably from 15.8 to 25.8% by weight of 6-methyloctanol;
- from 12.5 to 28.8% by weight, preferably from 14.5 to 26.5% by weight, particularly preferably from 15.5 to 25.5% by weight of 4-methyloctanol;
- from 3.3 to 7.3% by weight, preferably from 3.8 to 6.8% by weight, particularly preferably from 4.3 to 6.3% by weight of 2-methyloctanol;
- from 5.7 to 11.7% by weight, preferably from 6.3 to 11.3% by weight, particularly preferably from 6.7 to 10.7% by weight of 3-ethylheptanol;
- from 1.9 to 3.9% by weight, preferably from 2.1 to 3.7% by weight, particularly preferably from 2.4 to 3.4% by weight of 2-ethylheptanol;
- from 1.7 to 3.7% by weight, preferably from 1.9 to 3.5% by weight, particularly preferably from 2.2 to 3.2% by weight of 2-propylhexanol;
- from 3.2 to 9.2% by weight, preferably from 3.7 to 8.7% by weight, particularly preferably from 4.2 to 8.2% by weight of 3,5-dimethylheptanol;
- from 6.0 to 16.0% by weight, preferably from 7.0 to 15.0% by weight, particularly preferably from 8.0 to 14.0% by weight of 2,5-dimethylheptanol;
- from 1.8 to 3.8% by weight, preferably from 2.0 to 3.6% by weight, particularly preferably from 2.3 to 3.3% by weight of 2,3-dimethylheptanol;

from 0.6 to 2.6% by weight, preferably from 0.8 to 2,4% by weight, particularly preferably from 1.1 to 2.1% by weight of 3-ethyl-4-methylhexanol;

from 2.0 to 4.0% by weight, preferably from 2.2 to 3.8% by weight, particularly preferably from 2.5 to 3.5% by weight of 2-ethyl-4-methylhexanol;

from 0.5 to 6.5% by weight, preferably from 1.5 to 6% by weight, particularly preferably from 1.5 to 5.5% by weight of other alcohols having 9 carbon atoms; with the proviso that the entirety of the components mentioned gives 100% by weight.

Decanol

Isodecanol, which is used for the synthesis of the diisodecyl esters of the general formula (II) comprised in the plasticizer composition of the invention, is not a unitary chemical compound, but instead is a complex mixture of differently branched isomeric decanols.

These are generally produced via nickel- or Brønsted-acid-catalyzed trimerization of propylene, for example by the PolyGas® process or the EMOGAS® process explained above, subsequent hydroformylation of the resultant isononene isomer mixture by means of homogeneous rhodium or cobalt carbonyl catalysts, preferably by means of cobalt carbonyl catalysts, and hydrogenation of the resultant isodecanal isomer mixture, e.g. by means of the catalysts and processes mentioned above in connection with the production of $C_7$-$C_9$-alcohols (Ullmann's Encyclopedia of Industrial Chemistry; $5^{th}$ edition, vol. A1, p. 293, VCH Verlagsgesellschaft GmbH, Weinheim 1985). The resultant isodecanol generally has a high degree of branching.

2-Propylheptanol used for the synthesis of the di(2-propylheptyl) esters of the general formula (II) comprised in the plasticizer composition of the invention can be pure 2-propylheptanol or can be propylheptanol isomer mixtures of the type generally formed during the industrial production of 2-propylheptanol and likewise generally termed 2-propylheptanol.

Pure 2-propylheptanol can be obtained via aldol condensation of n-valeraldehyde and subsequent hydrogenation of the resultant 2-propylheptanal, for example in accordance with U.S. Pat. No. 2,921,089. By virtue of the production process, commercially obtainable 2-propylheptanol generally comprises, alongside the main component 2-propylheptanol, one or more of the following isomers of 2-propylheptanol: 2-propyl-4-methylhexanol, 2-propyl-5-methylhexanol, 2-isopropylheptanol, 2-isopropyl-4-methylhexanol, 2-isopropyl-5-methylhexanol, and/or 2-propyl-4,4-dimethylpentanol. The presence of other isomers of 2-propylheptanol, for example 2-ethyl-2,4-dimethylhexanol, 2-ethyl-2-methylheptanol, and/or 2-ethyl-2,5-dimethylhexanol, in the 2-propylheptanol is possible, but because the rates of formation of the aldehydic precursors of these isomers in the aldol condensation are low, the amounts of these present in the 2-propylheptanol are only trace amounts, if they are present at all, and they play practically no part in determining the plasticizer properties of the compounds produced from these 2-propylheptanol isomer mixtures.

Various hydrocarbon sources can be utilized as starting material for the production of 2-propylheptanol, for example 1-butene, 2-butene, raffinate I—an alkane/alkene mixture which is obtained from the $C_4$-cut of a cracker after removal of allenes, of acetylenes, and of dienes and which also comprises, alongside 1- and 2-butene, considerable amounts of isobutene—or raffinate II, which is obtained from raffinate I via removal of isobutene and then comprises, as olefin components other than 1- and 2-butene, only small proportions of isobutene. It is also possible, of course, to use mixtures of raffinate I and raffinate II as raw material for the production of 2-propylheptanol. These olefins or olefin mixtures can be hydroformylated by methods that are conventional per se with cobalt or rhodium catalysts, and 1-butene here gives a mixture of n- and isovaleraldehyde— the term isovaleraldehyde designating the compound 2-methylbutanal, the n/iso ratio of which can vary within relatively wide limits, depending on catalyst used and on hydroformylation conditions. By way of example, when a triphenylphosphine-modified homogeneous rhodium catalyst (Rh/TPP) is used, n- and isovaleraldehyde are formed in an n/iso ratio that is generally from 10:1 to 20:1 from 1-butene, whereas when rhodium hydroformylation catalysts modified with phosphite ligands are used, for example in accordance with U.S. Pat. No. 5,288,918 or WO 05028407, or when rhodium hydroformylation catalysts modified with phosphoamidite ligands are used, for example in accordance with WO 0283695, n-valeraldehyde is formed almost exclusively. While the Rh/TPP catalyst system converts 2-butene only very slowly in the hydroformylation, and most of the 2-butene can therefore be reclaimed from the hydroformylation mixture, 2-butene is successfully hydroformylated with the phosphite-ligand- or phosphorus amidite ligand-modified rhodium catalysts mentioned, the main product formed being n-valeraldehyde. In contrast, isobutene comprised within the olefinic raw material is hydroformylated at varying rates by practically all catalyst systems to 3-methylbutanal and, in the case of some catalysts, to a lesser extent to pivalaldehyde.

The $C_5$-aldehydes obtained in accordance with starting materials and catalysts used, i.e. n-valeraldehyde optionally mixed with isovaleraldehyde, 3-methylbutanal, and/or pivalaldehyde, can be separated, if desired, completely or to some extent by distillation into the individual components prior to the aldol condensation, and here again there is therefore a possibility of influencing and of controlling the composition of isomers of the $C_{10}$-alcohol component of the ester mixtures used in the process of the invention. Equally, it is possible that the $C_5$-aldehyde mixture formed during the hydroformylation is introduced into the aldol condensation without prior isolation of individual isomers. If n-valeraldehyde is used in the aldol condensation, which can be carried out by means of a basic catalyst, for example an aqueous solution of sodium hydroxide or of potassium hydroxide, for example by the processes described in EP-A 366089, U.S. Pat. No. 4,426,524, or U.S. Pat. No. 5,434,313, 2-propylheptanal is produced as sole condensate, whereas if a mixture of isomeric $C_5$-aldehydes is used the product comprises an isomer mixture of the products of the homoaldol condensation of identical aldehyde molecules and of the crossed aldol condensation of different valeraldehyde isomers. The aldol condensation can, of course, be controlled via targeted reaction of individual isomers in such a way that a single aldol condensation isomer is formed predominantly or entirely. The relevant aldol condensates can then be hydrogenated with conventional hydrogenation catalysts, for example those mentioned above for the hydrogenation of aldehydes, to give the corresponding alcohols or alcohol mixtures, usually after preceding, preferably distillative isolation from the reaction mixture and, if desired, distillative purification.

As mentioned above, the compounds of the general formula (II) comprised in the plasticizer composition of the invention can have been esterified with pure 2-propylheptanol. However, production of said esters generally uses mixtures of 2-propylheptanol with the propylheptanol isomers mentioned in which the content of 2-propylheptanol is at least 50% by weight, preferably from 60 to 98% by weight, and particularly preferably from 80 to 95% by weight, in particular from 85 to 95% by weight.

Suitable mixtures of 2-propylheptanol with the propylheptanol isomers comprise by way of example those of from 60 to 98% by weight of 2-propylheptanol, from 1 to 15% by weight of 2-propyl-4-methylhexanol, and from 0.01 to 20% by weight of 2-propyl-5-methylhexanol, and from 0.01 to 24% by weight of 2-isopropylheptanol, where the sum of the proportions of the individual constituents does not exceed 100% by weight. It is preferable that the proportions of the individual constituents give a total of 100% by weight.

Other suitable mixtures of 2-propylheptanol with the propylheptanol isomers comprise by way of example those of from 75 to 95% by weight of 2-propylheptanol, from 2 to 15% by weight of 2-propyl-4-methylhexanol, from 1 to 20% by weight of 2-propyl-5-methylhexanol, from 0.1 to 4% by weight of 2-isopropylheptanol, from 0.1 to 2% by weight of 2-isopropyl-4-methylhexanol, and from 0.1 to 2% by weight of 2-isopropyl-5-methylhexanol, where the sum of the proportions of the individual constituents does not exceed 100% by weight. It is preferable that the proportions of the individual constituents give a total of 100% by weight.

Preferred mixtures of 2-propylheptanol with the propylheptanol isomers comprise those with from 85 to 95% by weight of 2-propylheptanol, from 5 to 12% by weight of 2-propyl-4-methylhexanol, and from 0.1 to 2% by weight of 2-propyl-5-methylhexanol, and from 0.01 to 1% by weight of 2-isopropylheptanol, where the sum of the proportions of the individual constituents does not exceed 100% by weight. It is preferable that the proportions of the individual constituents give a total of 100% by weight.

When the 2-propylheptanol isomer mixtures mentioned are used instead of pure 2-propylheptanol for the production of the compounds of the general formula (II), the isomer composition of the alkyl ester groups and, respectively alkyl ether groups corresponds in practical terms to the composition of the propylheptanol isomer mixtures used for the esterification.

Undecanol

The undecanols used for the production of the compounds of the general formula (II) comprised in the plasticizer composition of the invention can be straight-chain or branched, or can be composed of mixtures of straight-chain and branched undecanols. It is preferable to use, as alcohol component, mixtures of branched undecanols, also termed isoundecanol.

Substantially straight-chain undecanol can be obtained via rhodium- or preferably cobalt-catalyzed hydroformylation of 1-decene and subsequent hydrogenation of the resultant n-undecanal. The starting olefin 1-decene is produced by way of the SHOP process mentioned previously for the production of 1-octene.

For the production of branched isoundecanol, the 1-decene obtained in the SHOP process can be subjected to skeletal isomerization, for example by means of acidic zeolitic molecular sieves, as described in WO 9823566, whereupon mixtures of isomeric decenes are formed, rhodium- or preferably cobalt-catalyzed hydroformylation of which, with subsequent hydrogenation of the resultant isoundecanal mixtures, gives the isoundecanol used for the production of the compounds (II) used in the invention. Hydroformylation of 1-decene or of isodecene mixtures by means of rhodium or cobalt catalysis can be achieved as described previously in connection with the synthesis of $C_7$-$C_{10}$-alcohols. Similar considerations apply to the hydrogenation of n-undecanal or of isoundecanal mixtures to give n-undecanol and, respectively, isoundecanol.

After distillative purification of the hydrogenation product, the resultant $C_7$-$C_{11}$-alkyl alcohols or a mixture of these can be used as described above for the production of the diester compounds of the general formula (II) used in the invention.

Dodecanol

Substantially straight-chain dodecanol can be obtained advantageously by way of the Alfol® process or Epal® process. These processes include the oxidation and hydrolysis of straight-chain trialkylaluminum compounds which are constructed stepwise by way of a plurality of ethylation reactions, starting from triethylaluminum, with use of Ziegler-Natta catalysts. The desired n-dodecanol can be obtained from the resultant mixtures of substantially straight-chain alkyl alcohols of varying chain length after distillative discharge of the $C_{12}$-alkyl alcohol fraction.

Alternatively, n-dodecanol can also be produced via hydrogenation of natural fatty acid methyl esters, for example from coconut oil.

Branched isododecanol can be obtained by analogy with known processes, e.g. described in WO 0063151, for the codimerization and/or oligomerization of olefins with subsequent hydroformylation and hydrogenation of the isoundecene mixtures, as for example described in DE-A 4339713. After distillative purification of the hydrogenation product, the resultant isododecanols or mixtures of these can be used as described above for the production of the diester compounds of the general formula (II) used in the invention.

Plastisol Applications

As described above, the good gelling properties of the plasticizer composition of the invention makes it particularly suitable for the production of plastisols.

The invention therefore further provides the use of a plasticizer composition as defined above as plasticizer in a plastisol.

Plastisols can be produced from various plastics. In one preferred embodiment, the plastisols of the invention are PVC plastisols.

The total amount of the plasticizer composition of the present invention, as defined above, in the PVC plastisols is usually in the range from 5 to 300 phr, preferably in the range from 50 to 200 phr.

Plastisols are usually converted to the form of the finished product at ambient temperature via various processes, such as spreading process, screen printing, casting processes, for example the slush molding process or rotomolding process, dip-coating process, spray process, and the like, Gelling then takes place via heating, whereupon cooling gives a homogeneous product with relatively high or relatively low flexibility.

PVC plastisols are particularly suitable for the production of PVC foils, for the production of seamless hollow bodies and of gloves, and for use in the textile sector, e.g. for textile coatings.

Due to its non-aromatic character, the plasticizer composition of the present invention has beneficial light- and UV-stabilizing properties. Therefore, the PVC plastisols prepared using the plasticizer composition of the invention are also particularly suitable for the production of PVC products that are used in outdoor applications.

More specifically, the PVC plastisols prepared using the plasticizer composition of the invention, are suitable for the production of artificial leather, automotive artificial leather, car underbody sealants and seam sealers, carpet backing and heavy weight coatings, conveyor belts, dipped goods and dip coatings, toys, such as dolls, balls, or toy animals, anatomic models for education, floorings, wall coverings, (coated) textiles, such as latex clothing, protective clothing, or rain gear, such as rain jackets, tarpaulins, for example truck tarpaulins or tenting, roofing panels, coil coatings, roofing membranes, sealants for closures, breathing masks and gloves.

Molding Composition Applications

The molding composition of the invention is preferably used for the production of moldings and foils. Among these are in particular housings of electrical devices, for example of kitchen devices, and computer housings; tooling; equipment; piping; cables; hoses, for example plastics hoses, water hoses and irrigation hoses, industrial rubber hoses, or chemicals hoses; wire sheathing; window profiles; profiles for conveyors, such as profiles for belt conveyors; vehicle-construction components, for example bodywork constituents, vibration dampers for engines; tires; furniture, for example chairs, tables, or shelving; foam for cushions and mattresses; gaskets; composite foils, such as foils for laminated safety glass, in particular for vehicle windows and/or window panes; self-adhesive foils; laminating foils; recording discs; packaging containers; adhesive-tape foils, or coatings.

The molding composition of the invention is also suitable for the production of moldings and foils which come directly into contact with people or with foods. These are primarily medical products, hygiene products, packaging for food or drink, products for the interior sector, toys and child-care items, sports-and-leisure products, apparel, or fibers for textiles, and the like.

The medical products which can be produced from the molding composition of the invention are by way of example tubes for enteral nutrition and hemodialysis, breathing tubes, infusion tubes, infusion bags, blood bags, catheters, tracheal tubes, disposal syringes, gloves, or breathing masks.

The packaging that can be produced from the molding composition of the invention for food or drink is by way of example freshness-retention foils, food-or-drink hoses, drinking-water hoses, containers for storing or freezing food or drink, lid gaskets, closure caps, crown corks, or synthetic corks for wine.

The products which can be produced from the molding composition of the invention for the interior sector are by way of example ground-coverings, which can be of homogeneous structure or can be composed of a plurality of layers, for example of at least one foamed layer, examples being floorcoverings, sports floors, or luxury vinyl tiles (LVTs), synthetic leathers, wallcoverings, or foamed or unfoamed wallpapers, in buildings, or can be cladding or console covers in vehicles.

The toys and child-care items which can be produced from the molding composition of the invention are by way of example dolls, inflatable toys, such as balls, toy figures, toy animals, anatomic models for education, modeling clays, swimming aids, stroller covers, baby-changing mats, bed-warmers, teething rings, or bottles.

The sports-and-leisure products that can be produced from the molding composition of the invention are by way of example gymnastics balls or other balls, exercise mats, seat cushions, massage balls and massage rolls, shoes and shoe soles, air mattresses, or drinking bottles.

The apparel that can be produced from the molding compositions of the invention is by way of example rubber boots.

Non-PVC Applications

The present invention also includes the use of the plasticizer composition of the invention as and/or in auxiliaries selected from: calendering auxiliaries; rheology auxiliaries; surfactant compositions, such as flow aids and film-forming aids, defoamers, antifoams, wetting agents, coalescing agents, and emulsifiers; lubricants, such as lubricating oils, lubricating greases, and lubricating pastes; quenchers for chemical reactions; phlegmatizing agents; pharmaceutical products; plasticizers in adhesives or sealants; impact modifiers, and antiflow additives.

The figures described below and the examples provide further explanation of the invention. These figures and examples are not to be understood as restricting the invention.

The following abbreviations are used in the examples and figures below:

Glutarate stands for a mixture consisting of the following components:

| Components | Amount (% w/w) [1] |
|---|---|
| 2-Methylglutaric acid dicyclohexylester | 91.8 ± 2.3 |
| 2-Ethylsuccinic acid dicyclohexylester | 5.7 ± 1.0 |
| Cyclohexyl monoesters of 2-methylglutaric acid and other impurities | 2.5 ± 0.4 |

[1] determined by GC analysis.

INB stands for isononylbenzoate,

IDB stands for isodecylbenzoate,

Hexamoll® DINCH® for diisononylcyclohexanedicarboxylate,

DINP stands for diisononylphthalate, phr stands for parts by weight per hundred parts by weight of polymer, GC stands for gas chromatography,

EXAMPLES

Figure 1:
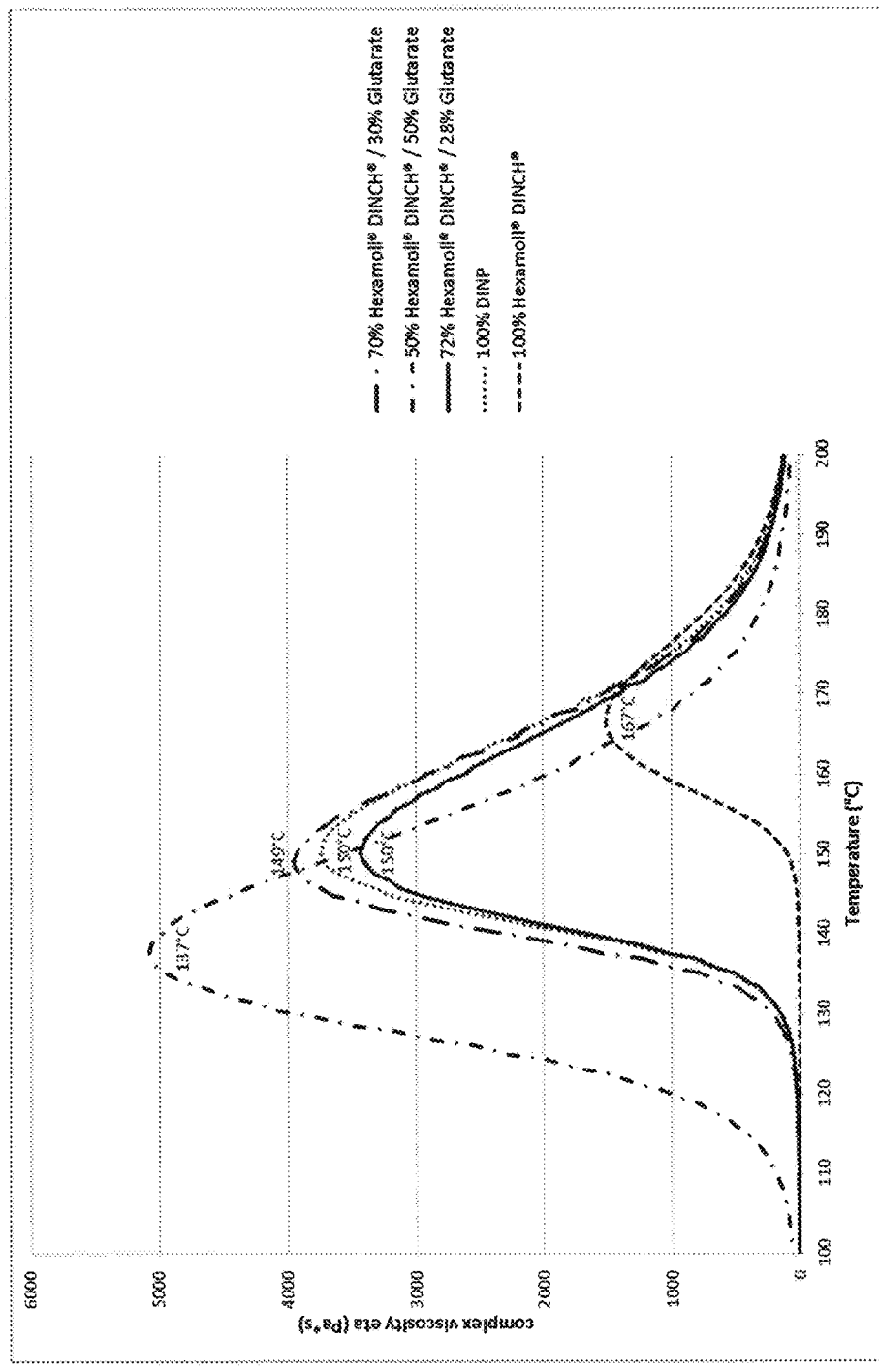
FIG. 1 shows the gelling behavior of PVC plastisols with in each case a total proportion of 100 phr of plasticizer composition of the invention. The complex viscosity $\eta^*[Pa \cdot s]$ of the plastisols is depicted as a function of the temperature [° C.]. To this end, plasticizer compositions were used comprising the commercially available plasticizer Hexamoll® DINCH® and various amounts of the fast fuser glutarate. The gelling behavior of PVC plastisols which contain exclusively the commercially available plasticizers Hexamoll® DINCH® or DINP (Palatinol® N) is also shown in comparison.

The following feedstocks are used in the examples:

| Feedstock | Manufacturer |
| --- | --- |
| Homopolymeric PVC-emulsion, brand name Solvin ® 367 NC | SolVin SA, Brussels, Belgium |
| Homopolymeric PVC-emulsion, brand name Vinnolit ® P 70 | Vinnolit GmbH, Ismaning, Germany |
| Isononylbenzoate (abbr.: INB), brand name Vestinol ® INB | Evonik, Marl, Germany |
| Isodecylbenzoate (abbr.: IDB), brand name Jayflex ® MB 10 | Exxonmobil Chemical Belgium, Antwerpen, Belgium |
| Diisononylcyclohexanedicarboxylate, brand name Hexamoll ® DINCH ® | BASF SE, Ludwigshafen, Germany |
| Diisononylphthalate (abbr.: DINP), brand name Palatinol ® N | BASF SE, Ludwigshafen, Germany |
| Ba—Zn Stabilizer, brand name Reagens ® SLX/781 | Reagens S.p.A., Bologna, Italy |

I) Examples of Production of Compounds (I.a) and (I.b) Used in the Invention

Example 1.1

Procedure for the preparation of mixtures containing 2-methylgiutaric acid dicyclohexylester and 2-ethylsuccinic acid dicyclohexylester via direct esterification 280 g cyclohexanol, 210 g of a mixture consisting of 88% by weight of 2-methylglutaric acid and 12% by weight of 2-ethylsuccinic acid, and 2 g of sulphuric acid are successively introduced into a 1 l reactor. The reaction mixture is heated while being stirred. During the heating, water is distilled off while entraining a small amount of residual light alcohols. The reaction medium is maintained at 120° C. for 3 hours. After heating for 3 hours, the temperature of the medium is brought back to ambient temperature. The medium is then washed with an aqueous saturated $NaHCO_3$ solution. The organic phase comprises 93% of diesters. It is subsequently distilled at 180-190° C. under a pressure of 20 mmHg in order to obtain a product comprising 97-100% by weight of diesters.

This method can be used analogously for the preparation of 2-methylglutaric acid dicyclohexylester, 2-ethylsuccinic acid dicyclohexylester and adipic acid dicyclohexylester, either as single compounds or in the form of mixtures thereof.

II) Performance Testing

II.a) Determination of the Solubility Temperature According to DIN 53408:

To characterize the gelling performance of the compounds (I.a) and (I.b) used according to the invention in PVC, the solubility temperature according to DIN 53408 was determined. The lower the solubility temperature is, the better is the gelling performance of the respective substance for PVC.

The table below lists the solubility temperatures of the fast fuser used according to the invention, glutarate and, for comparison, the solubility temperatures of the commercially available fast fusers INB (isononyl benzoate), brand name Vestinol® INB, and IDB, brand name Jayflex® MB 10, as well as of the commercially available plasticizer Hexamoll® DINCH® and DINP, brand name Palatinol® N.

| Ex.-No. | Substance | solubility temperature according to DIN 53408 [° C.] |
| --- | --- | --- |
| 1 | Glutarate | 98 |
| V1 | Vestinol ® INB | 128 |
| V2 | Jayflex ® MB 10 | 131 |
| V3 | Hexamoll ® DINCH ® | 151 |
| V4 | Palatinol ® N | 131 |

As can be seen from the table above, the fast fusers used according to the invention, glutarate, exhibits a significantly lower solubility temperature for PVC than both the commercially available fast fusers Vestinol® INB and Jayflex® MB 10 as well as both the commercially available plasticizers Hexamoll® DINCH® and Palatinol® N.

II.b) Determination of the Gellinq Behavior of PVC Plastisols in Combination with the Plasticizer Compositions of the Invention In order to investigate the gelling behavior of PVC plastisols based on the plasticizer compositions of the invention, PVC plastisols which contain mixtures of the commercially available plasticizer Hexamoll® DINCH® and the fast fuser glutarate in different proportions (amount of Hexamoll® DINCH® to glutarate=50/50, 70/30 and 72/28) were produced in accordance with the following formulation:

| Additive | phr |
| --- | --- |
| PVC (mixture of 70 parts by weight of the homopolymeric PVC emulsion, brand name Solvin ® 367 NC, and 30 parts by weight of homopolymeric PVC emulsion, brand name Vinnolit ® P 70 | 100 |

| Additive | phr |
|---|---|
| Plasticizer composition according to the invention | 100 |
| Ba—Zn stabilizer, brand name Reagens ® SLX/781 | 2 |

For comparison, plastisols which comprise exclusively the commercially available plasticizers Hexamoll® DINCH® or DINP (Palatinol® N) were also produced.

The plastisols were produced in such a way that the two PVC types were weighted out together in one PE (polyethylene) beaker. In a second PE beaker, the liquid components were weighted out. By means of a dissolver (from Jahnke & Kunkel, IKA-Werk, type RE-166 A, rotation speed from 60 to 6000 min$^{-1}$, diameter of the dissolver disc 40 mm), the PVC was stirred into the liquid components at a rotation speed of 400 min$^{-1}$. After a plastisol had formed, the rotation speed was increased to 2500 min$^{-1}$, and the mixture was homogenized for 150 s. The plastisol was transferred from the PE beaker into a steel bowl, which was then opposed to full vacuum in a desiccator to deaerate the plastisol. The plastisol thus prepared was used for rheological measurements. The measuring of all plastisols started 30 min after homogenizing.

In order to gel a liquid PVC plastisol and to convert it from the condition of PVC particles homogeneously dispersed in plasticizer to a homogeneous, solid plasticized PVC matrix, the required energy has to be introduced in the form of heat. Parameters available for this purpose during processing are temperature and residence time. The faster the gelling is, the lower the temperature can be selected (keeping the residence time constant) or the lower the residence time can be selected (keeping the temperature constant). In this case, the indicator for the gelling speed is the solubility temperature, i.e. the lower this temperature is, the faster proceeds the gelling of the material.

Viscosity was measured with a heatable Anton Paar MCR101 rheometer for oscillatory and rotational tests. Oscillatory viscosity tests were carried out using the following parameters:

| | |
|---|---|
| measuring system: | parallel plate, 50 mm diameter |
| amplitude (gamma): | 1% |
| frequency: | 1 Hz |
| gap width: | 1 mm |
| starting temperature: | 20° C. |
| temperature profile: | 20° C.-200° C. |
| heating rate: | 10° C./min |
| number of measuring points: | 201 |
| duration of measuring point/soaking time: | 0.09 min |

The measurement was performed in two ramps. The first ramp served for setting the temperature. At 20° C., the plastisol was slightly sheared for 2 min at constant amplitude (gamma=1%). With the second ramp, the temperature program started. On measuring, both the storage modulus and the loss modulus were recorded, from which the complex viscosity η* was evaluated. The temperature correlating to the maximum of the complex viscosity η* is considered as gelling temperature of the plastisol.

As FIG. 1 clearly shows, the PVC plastisols with the plasticizer composition of the invention gel at significantly lower temperatures than the PVC plastisol containing exclusively the commercially available plasticizer Hexamoll® DINCH®. Even compositions of 72% by weight of Hexamoll® DINCH® and 28% by weight of glutarate arrive at a gelling temperature of 150° C. The gelling temperature of 150° C. corresponds to the gelling temperature of the commercially available plasticizer Palatinol® N and is sufficient for a lot of plastisol applications. It is possible to further reduce the gelling temperature of the plastisols significantly by further increasing the proportion of the fast fuser glutarate in the plasticizer compositions according to the invention.

II.c) Determination of the Gelling Behavior of PVC Plastisols in Combination with Plasticizer Compositions from Commercially Available Fast Fusers in Comparison to the Plasticizer Compositions of the Invention In order to investigate the gelling behavior of PVC plastisols based on plasticizer compositions from commercially available fast fusers compared to the plasticizer compositions of the invention, first the mixing ratio of the commercially available fast fusers INB (Vestinol® INB) and IDB (Jayflex® MB 10) with the commercially available plasticizer Hexamoll® DINCH®, was determined analogously to the method described in II.a), which mixing ratio results in a gelling temperature of 150° C. (corresponding to the gelling temperature of the commercially available plasticizer Palatinol® N).

As for Vestinol® INB, this mixing ratio is 55% by weight of Vestinol® INB and 45% by weight of Hexamoll® DINCH®. As for IDB (Jayflex® MB 10), this mixing ratio is 67% by weight of IDB (Jayflex® MB 10) and 33% by weight of Hexamoll® DINCH®.

Figure 2:
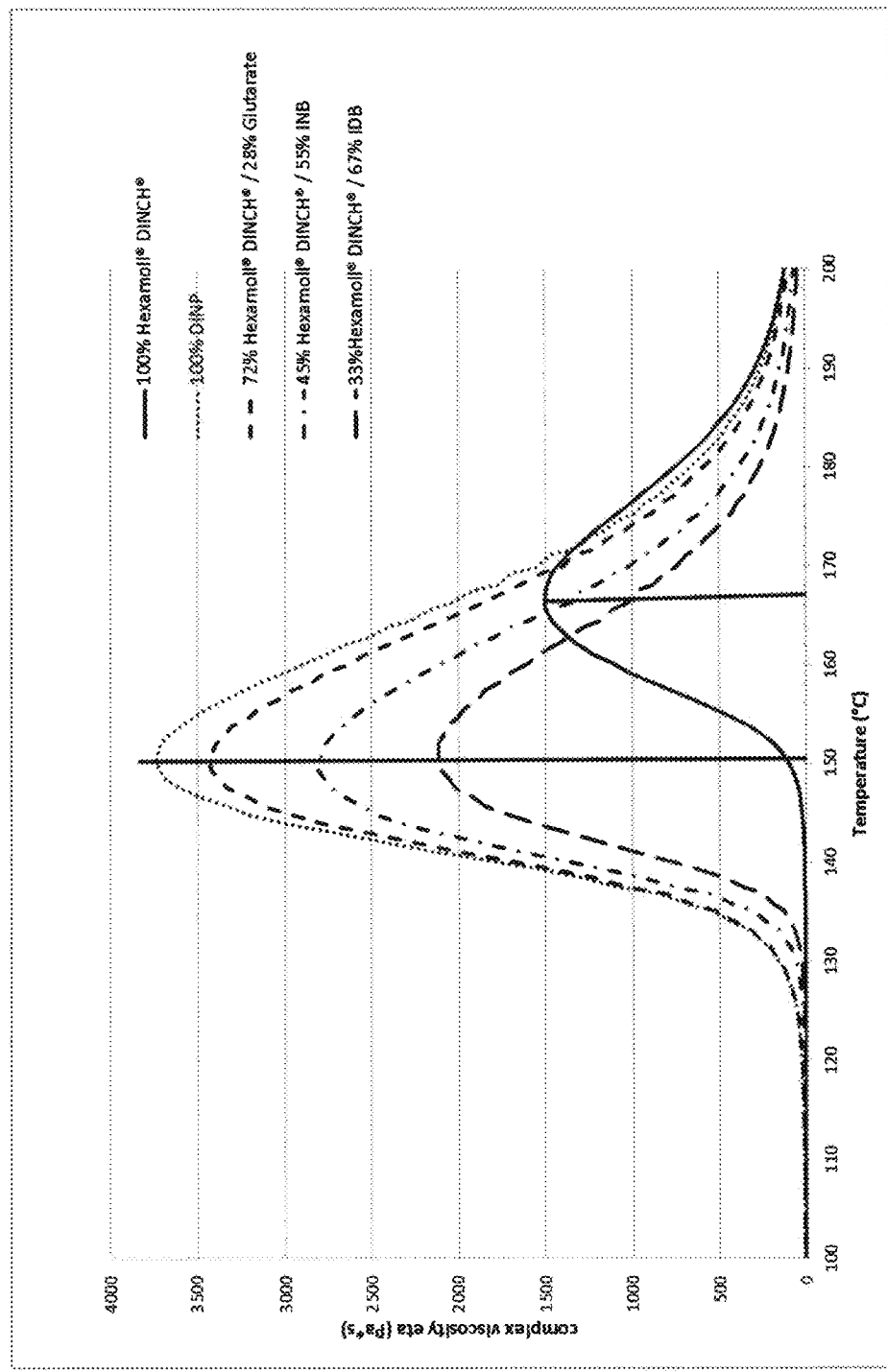
FIG. 2 shows the gelling behavior of PVC plastisols containing specific blends of Hexamoll® DINCH® with glutarate and the commercially available fast fusers INB (Vestinol® INB) or IDB (Jayflex® MB 10). The amount of fast fuser in the plasticizer compositions is chosen such that a gelling temperature of 150° C. is reached. The complex viscosity $\eta^*[Pa \cdot s]$ of the plastisols is depicted as a function of the temperature [° C.]. The gelling behavior of PVC plastisols, which exclusively contain the commercially available plasticizers Hexamoll® DINCH® or DINP (Palatinol® N), is also shown as comparison. The total amount of plasticizer in the plastisols is 100 phr.

FIG. 2 shows the gelling graphs of the PVC plastisols containing plasticizer compositions from the commercially available fast fusers INB (Vestinol® INB) and IDB (Jayflex® MB 10) compared to the gelling graphs of the PVC plastisols containing the plasticizer compositions of the invention. For comparison, the gelling graphs of PVC plastisols which contain exclusively the commercially available plasticizers Hexamoll® DINCH® and DINP (Palatinol® N) are also shown.

FIG. 2 clearly shows that in the plasticizer composition of the invention a proportion of as low as 28% by weight of the fast fuser of the invention, i.e. of glutarate, is sufficient to arrive at a gelling temperature of 150° C. (corresponding to the gelling temperature of the commercially available plasticizer Palatinol® N). In contrast thereto, in the plasticizer composition based on the commercially available fast fusers INB (Vestinol® INB) and IDB (Jayflex® MB 10), much higher proportions of 55% by weight INB and 67% by weight IDB (Jayflex® MB 10), respectively, are required to arrive at a gelling temperature of the plastisols of 150° C. (corresponding to the gelling temperature of the commercially available plasticizer Palatinol® N). Thus, the fast fuser of the invention, glutarate, exhibits much better gelling properties than the commercially available fast fusers INB (Vestinol® INB) and IDB (Jayflex® MB 10).

II.d) Determination of the Plasticizer Volatility During Processing of the Plasticizer Compositions of the Invention in Comparison to Plasticizer Compositions from Commercially Available Fast Fusers Plasticizer volatility during processing is understood to mean the weight loss of plasticizer during processing of the plastisols, and is here and hereinafter also referred to as process-volatility.

As described in II.b), plastisols based on a plasticizer composition according to the invention comprising 28% by weight of the fast fuser glutarate and 72% by weight of the commercially available plasticizer Hexamoll® DINCH®, plasticizer compositions comprising 55% by weight of the commercially available fast fuser INB (Vestinol® INB) and 45% by weight of the commercially available plasticizer Hexamoll® DINCH®, as well as plasticizer compositions comprising 67% by weight of the commercially available fast fuser IDB (Jayflex® MB 10) and 33% by weight of the commercially available plasticizer Hexamoll® DINCH® were produced according to the following formulation:

| Additive | phr |
|---|---|
| PVC (mixture of 70 parts by weight of the homopolymeric PVC emulsion, brand name Solvin ® 367 NC, and 30 parts by weight of homopolymeric PVC emulsion, brand name Vinnolit ® P 70 | 100 |
| Plasticizer composition | 60 |
| Ba—Zn stabilizer, brand name Reagens ® SLX/781 | 2 |

For comparison, plastisols which comprise exclusively the commercially available plasticizers Hexamoll® DINCH® or DINP (Palatinol® N) were also produced.

Production of a Precursor Foil

In order to investigate the application-technical properties, the liquid plastisol had to be transformed to a processible solid foil. For this, the plastisol was pre-gelled at low temperature.

The gelling of the plastisol was performed in an oven from Mathis (Mathis oven) with the following settings:
exhaust air: hatch entirely open
fresh air: open
circulating air: maximum position
overgrate/undergrate air: overgrate air position 1

Production Procedure:

New release paper was introduced into of the material holder of the Mathis oven. The oven was pre-heated to 140° C. The gelling time was set to 25 s. The slot between paper and the squeegee was set to 0.1 mm by means of the template. The gauge was set to 0.1 mm. Then, the slot was adjusted to a value of 0.7 mm according to the gauge.

The plastisol was applied onto the paper and smoothed out with the squeegee. Subsequently, the starter button was pushed and the material holder was drawn in the oven. After 25 s, the material holder was ejected from the oven. The plastisol was gelled, and the emerged foil could be drawn off the paper as a whole. The foil had a thickness of about 0.5 mm.

Determination of the Plasticizer Volatility During Processing

In order to determine the plasticizer volatility during processing, 3 square specimens (49×49 mm) were stamped out from each pre-foil by means of a Shore-hardness steel punch, weighted and subsequently gelled in the Mathis oven at 190° C. for 2 min. After cooling, the specimens were weighted again, and the weight loss was evaluated in %. Each time, the specimens were located exactly on the same position on the release paper, evenly distributed along the width of the paper.

Figure 3:
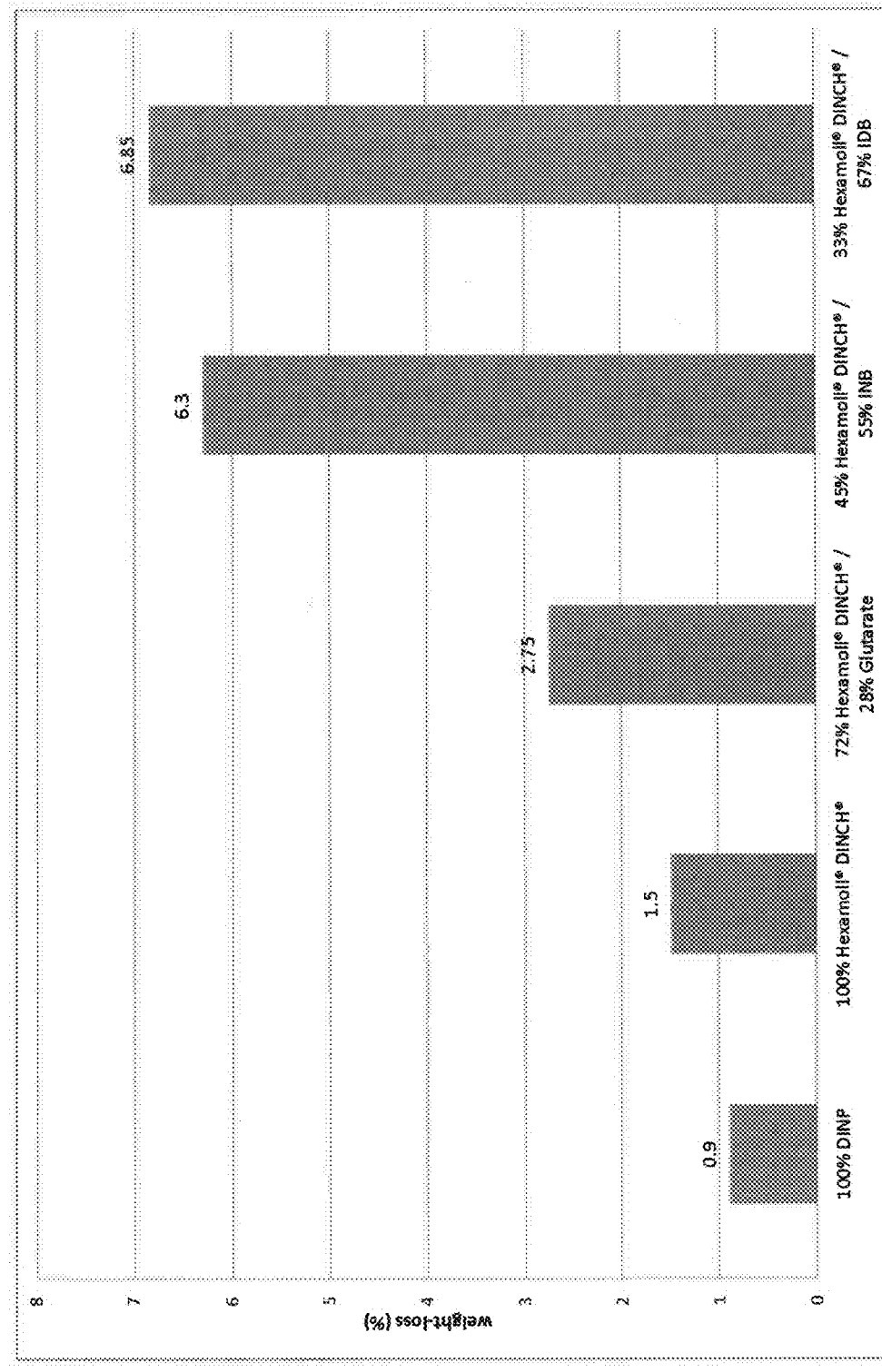
FIG. 3 shows the process-volatility of PVC plastisols, gelled at 190° C. for 2 min., containing 60 phr of the plasticizer composition according to the invention as well as of different blends of Hexamoll® DINCH® with the commercially available fast fusers INB (Vestinol® INB) or IDB (Jayflex® MB 10). Displayed is the weight-loss of the plastisols in %. The process-volatility of PVC plastisols, which contain exclusively the commercially available plasticizers Hexamoll® DINCH® or DINP (Palatinol® N), is also shown in comparison.

FIG. 3 clearly shows that the plasticizer volatility during processing of the plasticizer composition of the invention composed of 28% by weight of glutarate and 72% by weight of Hexamoll® DINCH® is significantly lower than the plasticizer volatility during processing of the plasticizer compositions composed of 55% by weight of INB (Vestinol® INB) and 45% by weight of Hexamoll® DINCH® as well as of 67% by weight of IDB (Jayflex® MB 10) and 33% by weight of Hexamoll® DINCH®. Thus, the plasticizer compositions according to the invention loose significantly less plasticizer during processing of the corresponding plastisols.

Nevertheless, the process-volatility of the plasticizer composition of the invention composed of 28% by weight of glutarate and 72% by weight of Hexamoll® DINCH® is higher than the process-volatility of the pure plasticizers Hexamoll® DINCH® and Palatinol® N.

II.e) Determination of the Shore a Hardness of Foils Composed of Plastisols Based on the Plasticizer Compositions of the Invention in Comparison to Foils Composed of Plastisols Based on Plasticizer Compositions from Commercially Available Fast Fusers The Shore A hardness characterizes the elasticity of plasticized PVC articles. The lower the Shore hardness is, the more elastic is the PVC article.

As described in II.c), specimens of 49×49 mm were stamped out from each pre-foil and gelled analogously to the determination of the process-volatility, three specimens at a time at 190° C. for 2 min. Thus, in total, 27 foil specimens were gelled. All 27 specimens were stacked one on top of each other in a molding frame and pressed at 195° C. to give a test block of 10 mm height.

Figure 4:
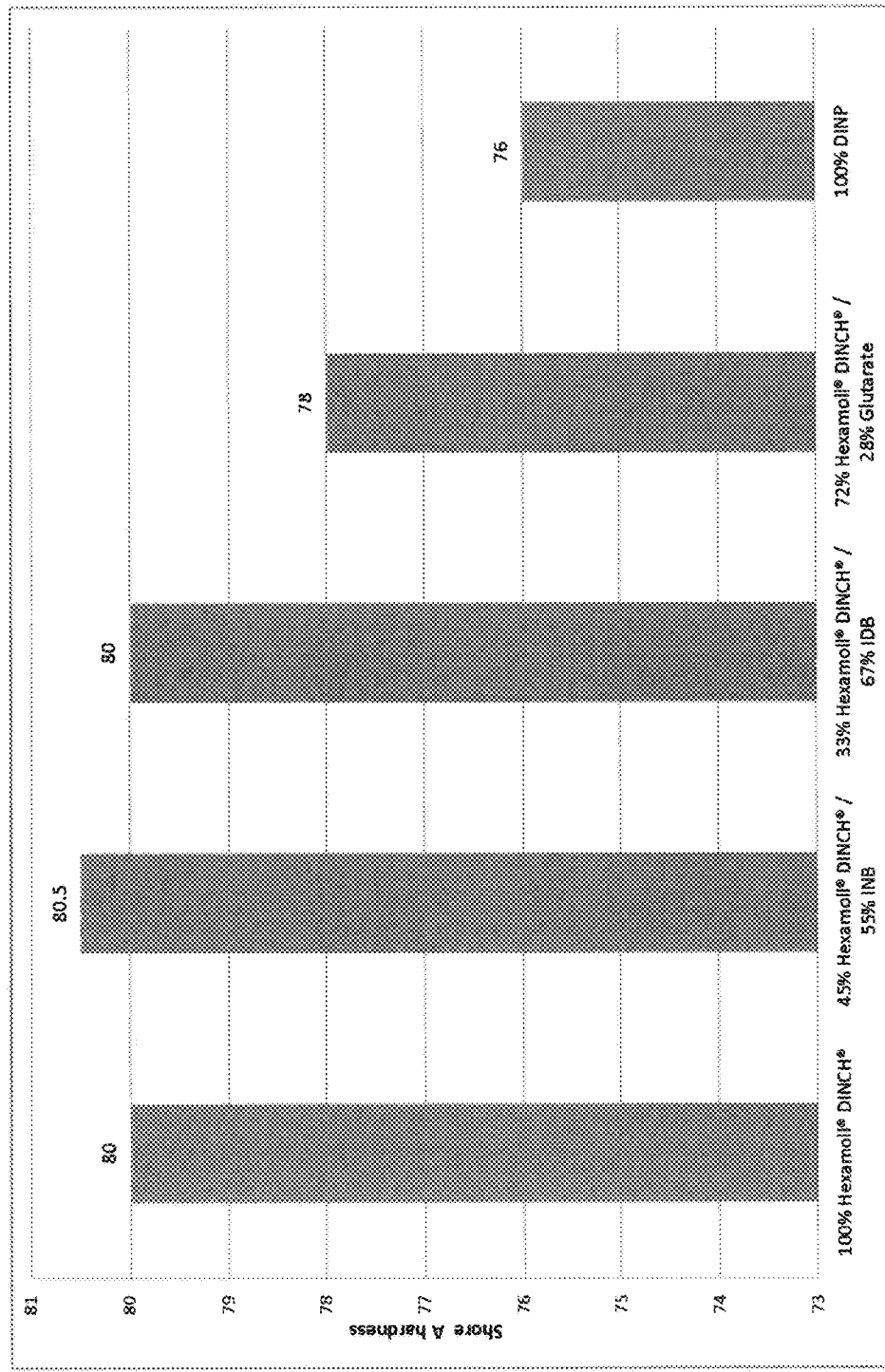
FIG. 4 shows the Shore A hardness of PVC foils that are produced from PVC plastisols containing 60 phr of the plasticizer composition according to the invention as well as of different blends of Hexamoll® DINCH® with the commercially available fast fusers INB (Vestinol® INB) or IDB (Jayflex® MB 10). The Shore A hardness of PVC foils that are produced from PVC plastisols which contain exclusively the commercially available plasticizers Hexamoll® DINCH® or DINP (Palatinol® N) is also shown in comparison. The shore A hardness of the PVC foils were measured according to DIN EN ISO 868 of October 2003 using a measuring time of 15 seconds.

Shore Hardness Determination:
method: DIN EN ISO 868 of October 2003
using a digital durometer type DD-3 from Hildebrand test block of 49 mm×49 mm×10 mm (length×width×height) from 27 gelled foil specimens
storage for 7 d in a conditioning chamber at 23° C. and 50% rel. humidity before measuring
measuring time: 15 s
mean value taken from 10 individual measurements FIG. 4 clearly shows that the Shore A hardness of the foil of the plastisol based on the plasticizer composition of the invention composed of 28% by weight of glutarate and 72% by weight of Hexamoll® DINCH® is significantly lower than the Shore A hardness of the foil of the plastisols based on the plasticizer compositions composed of 55% by weight INB (Vestinol® INB) and 45% by weight of Hexamoll® DINCH® as well as of 67% by weight IDB (Jayflex® MB 10) and 33% by weight of Hexamoll® DINCH®. Thus, the plasticizer compositions according to the invention allows for a greater elasticity of PVC articles.

Moreover, the Shore A hardness of the foil of the plastisol based on the plasticizer composition of the invention composed of 28% by weight of glutarate and 72% by weight of Hexamoll® DINCH® is significantly lower than the Shore A hardness of the foil of the plastisol based on pure plasticizers Hexamoll® DINCH® but higher than the Shore A hardness of the foil of the plastisol based on pure Palatinol® N.

II.f) Determination of the Plasticizer Volatility of Foils from Plastisols Based on the Plasticizer Compositions of the Invention in Comparison to Foils from Plastisols Based on Plasticizer Compositions from Commercially Available Fast Fusers Plasticizer volatility of foils characterizes the volatility of a plasticizer in ready-made, plasticized PVC articles and is here and hereinafter also referred to as foil-volatility.

In order to determine the foil-volatility, plastisols based on the plasticizer composition according to the invention comprising 28% by weight of glutarate and 72% by weight of Hexamoll® DINCH®, and also plastisols based on plasticizer compositions comprising 55% by weight of INB (Vestinol® INB) and 45% by weight of Hexamoll® DINCH®, as well as comprising 67% by weight of IDB (Jayflex® MB 10) and 33% by weight of Hexamoll® DINCH® were produced as described in II.c). For comparison, also plastisols containing exclusively the commercially available plasticizers Hexamoll® DINCH® and Palatinol®

N, respectively, were prepared. Different to the procedure described above, the plastisols were immediately gelled in the Mathis oven at 190° C. for 2 min. The thus obtained foils had a thickness of about 0.5 mm and were used for the determination of the foil-volatility.

Determination of the Foil-volatility 130° C. Over a Period of 24 h:

From the plastisols, which had been gelled at 190° C. for 2 min, four individual films of 150×100 mm were cut out, perforated and weighted. The foils were then placed on a rotating star in a drying chamber from Heraeus drying cabinet, type 5042 E, at a temperature of 130° C. In the drying chamber, the air was exchanged 18 times per hour corresponding to a fresh air supply of 800 I/h. After 24 h, the foils were removed from the drying chamber and weighted again. The weight loss was evaluated in % and gave the plasticizer volatility of the foils.

Figure 5:
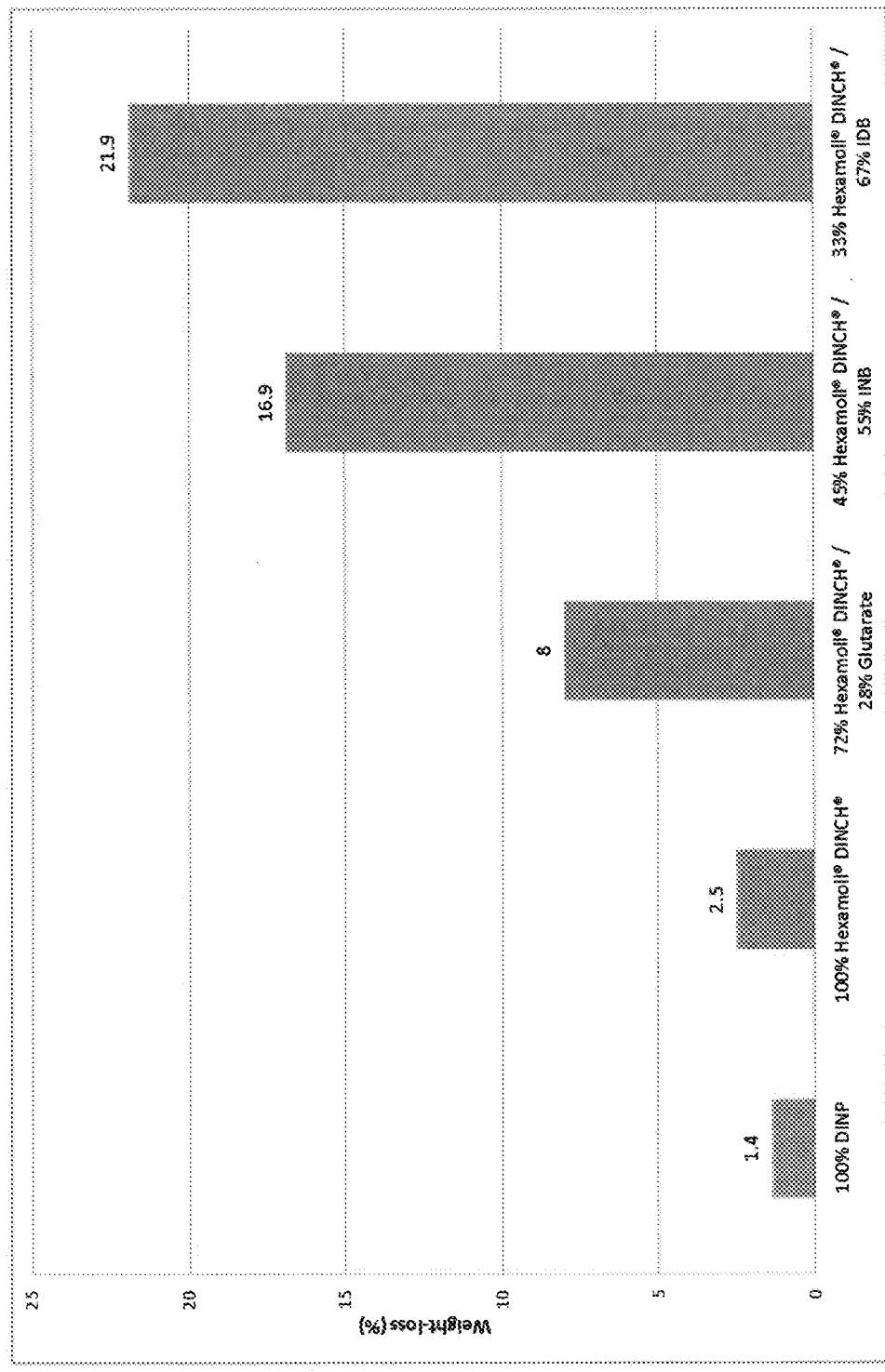
FIG. 5 shows the foil-volatility of PVC foils that are produced from PVC plastisols containing 60 phr of the plasticizer composition according to the invention as well as of different blends of Hexamoll® DINCH® with the commercially available fast fusers INB (Vestinol® INB) or IDB (Jayflex® MB 10). Displayed is the weight-loss of the PVC foils in % after heating the PVC-foils for 24 hours at 130° C. The foil-volatility of PVC foils that are produced prom PVC plastisols which contain exclusively the commercially available plasticizers Hexamoll® DINCH® or DINP (Palatinol® N) is also shown as comparison.

FIG. 5 clearly shows that the foil-volatility of the plasticizer composition of the invention composed of 28% by weight of glutarate and 72% by weight of Hexamoll® DINCH® is significantly lower than the foil-volatility of the plasticizer compositions composed of 55% by weight of INB (Vestinol® INB) and 45% by weight of Hexamoll® DINCH® as well as of 67% by weight of IDB (Jayflex® MB 10) and 33% by weight of Hexamoll® DINCH®. Thus, the plasticizer compositions according to the invention loose significantly less plasticizer from the corresponding ready-made PVC articles.

Nevertheless, the foil-volatility of the plasticizer composition of the invention composed of 28% by weight of glutarate and 72% by weight of Hexamoll® DINCH® is higher than the foil-volatility of the pure plasticizers Hexamoll® DINCH® and Palatinol® N.

II.g) Determination of the Mechanical Properties of Foils Composed of Plastisols Based on the Plasticizer Compositions of the Invention in Comparison to Foils Composed of Plastisols Based on Plasticizer Compositions from Commercially, Available Fast Fusers.

The mechanical properties of plasticized PVC articles were characterized in respect of elongation at break. The higher the value is the better are the mechanical properties of the plasticized PVC articles.

In order to determine the mechanical properties, plastisols based on the plasticizer composition according to the invention comprising 28% by weight of glutarate and 72% by weight of Hexamoll® DINCH®, and also plastisols based on plasticizer compositions comprising 55% by weight of IB'NB (Vestinol® INB) and 45% by weight of Hexamoll® DINCH®, as well as comprising 67% by weight of IDB (Jayflex® MB 10) and 33% by weight of Hexamoll® DINCH® were produced as described in II.c). For comparison, also plastisols containing exclusively the commercially available plasticizers Hexamoll® DINCH® and Palatinol® N, respectively, were prepared. Different to the procedure described above, the plastisols were immediately gelled in the Mathis oven at 190° C. for 2 min. The thus obtained foils had a thickness of about 0.5 mm and were used for the determination of the mechanical properties.

Figure 6:
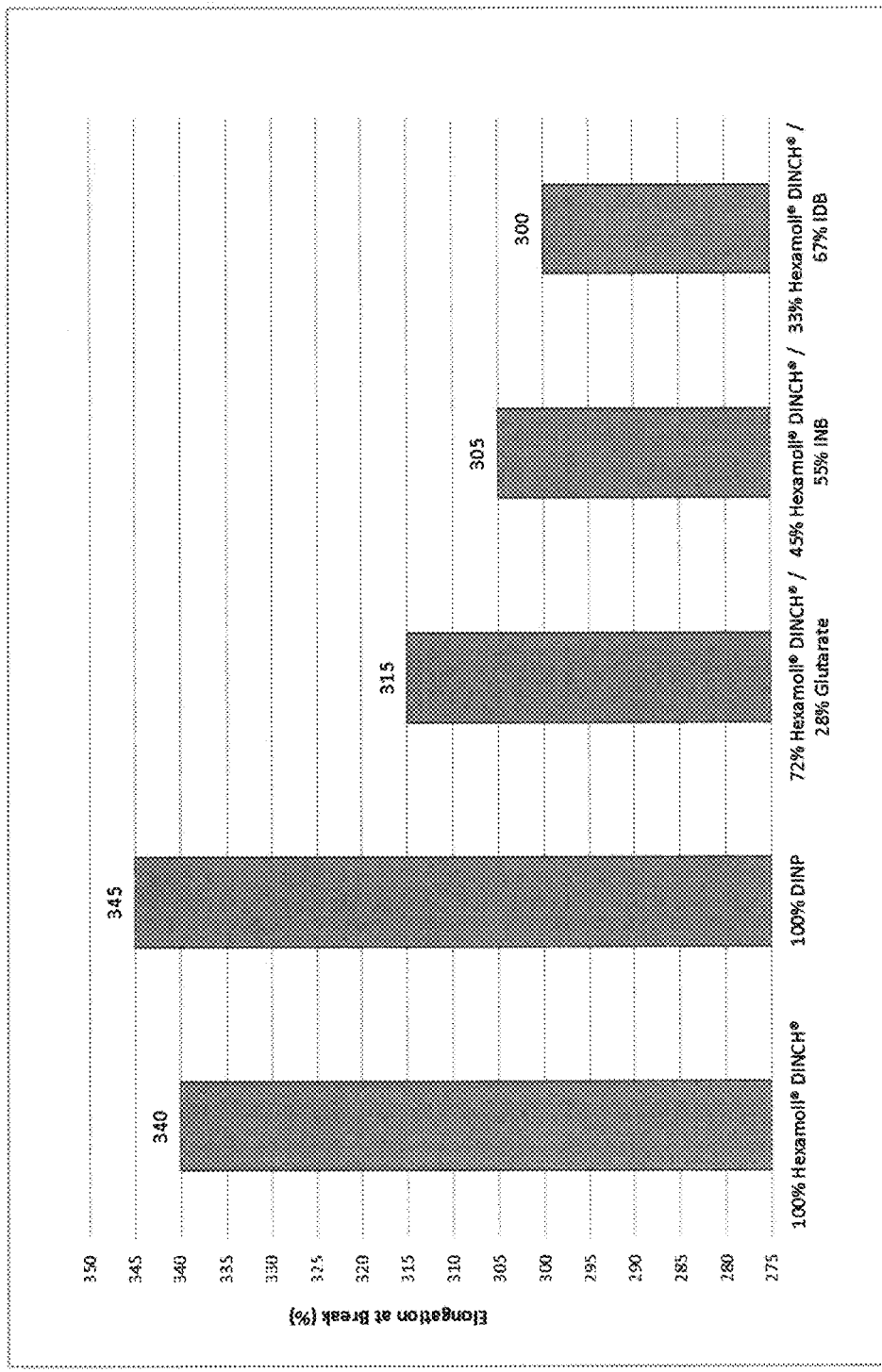
FIG. 6 shows the elongation at break of PVC foils that are produced from PVC plastisols containing 60 phr of the plasticizer composition according to the invention as well as of different blends of Hexamoll® DINCH® with the commercially available fast fusers INB (Vestinol® INB) or IDB (Jayflex® MB 10).

Determination of Elongation at Break:
    method according to DIN EN ISO 527, parts 1 and 3 using a Zwick, brand name TMZ 2.5/TH1S
        specimen: according to DIN EN ISO 527 part 3, stamped out foil strips, type 2 with a length of 150 mm and a width of 15 mm
    number of specimens: 10 specimen per testing
    storage for 7 d in standard atmosphere (23° C.±1° C., 50% humidity) before measuring
    smooth-convex clamps, clamping pressure of 6 bar
    clamping length: 100 mm
    measuring length corresponding to clamping length=100 mm.
    test speed: 100 mm/min FIG. 6 clearly shows that the elongation at break of the foil of the plastisol based on the plasticizer composition of the invention composed of 28% by weight of glutarate and 72% by weight of Hexamoll® DINCH® is higher than the elongation at break of the foils of the plastisols based on the plasticizer compositions composed of 55% by weight of INB (Vestinol® INB) and 45% by weight of Hexamoll® DINCH® as well as of 67% by weight of IDB (Jayflex® MB 10) and 33% by weight of Hexamoll® DINCH®, but is lower than the values of the foils of the plastisols based on pure plasticizers Hexamoll® DINCH® and Palatinol® N, respectively.

II.h) Determination of the Compatibility (Permanence) of Foils Composed of Plastisols Based on the Plasticizer Compositions of the Invention in Comparison to Foils Composed of Plastisols Based on Plasticizer Compositions from Commercially Available Fast Fusers The compatibility (permanence) of plasticizers in plasticized PVC articles characterizes the extent in which plasticizers tend to exude or evaporate from the plasticized PVC articles during usage and thus impairing the service ability of the PVC articles.

In order to determine the compatibility, plastisols based on the plasticizer composition according to the invention comprising 28% by weight of glutarate and 72% by weight of Hexamoll® DINCH®, and also plastisols based on plasticizer compositions comprising 55% by weight of INB (Vestinol® INB) and 45% by weight of Hexamoll® DINCH®, as well as comprising 67% by weight of IDB (Jayflex® MB 10) and 33% by weight of Hexamoll® DINCH® were produced as described in II.c). For comparison, also plastisols containing exclusively the commercially available plasticizers Hexamoll® DINCH® and Palatinol® N, respectively, were prepared. Different to the procedure described above, the plastisols were immediately gelled in the Mathis oven at 190° C. for 2 min. The thus obtained foils had a thickness of about 0.5 mm and were used for the determination of the compatibility (permanence).

Test Method:

The test was intended to both qualitatively and quantitatively determine the compatibility of plasticized PVC formulations. The test was performed at elevated temperature (70° C.) and humidity (100% rel. humidity). The obtained data were evaluated as a function of the storage time.
    Specimen: For standard tests, 10 specimens (foils) each were used with a size of 75 mm×110 mm×0.5 mm. The foils were perforated at their broad side, labelled and weighted. The labelling had to be indelible and could be done by soldering for example.
    Test equipment: heating cabinet, analytic scales, gauge and sensor for the temperature inside the heating cabinet, glass basin, stainless steel racks
    Test temperature: 70° C.
    Test medium: water vapor formed at 70° C. from demineralized water Procedure:

The temperature inside the heating cabinet was set to 70° C. The foils were placed on a steel rack and placed in a glass basin filled with demineralized water to a height of 5 cm. The glass basin was water-vapor-tightly sealed with a PE film and placed in the heating cabinet.

Storage Time:

After 1, 3, and 7 days, 2 foils each (repeat determination) were taken from the glass basin and acclimatized for 1 h freely suspended in the air. Then, the foil was wiped with methanol and weighted (wet value). Subsequently, the foil was dried in a drying cabinet (with natural convection) freely suspended at 70° C. for 16 h. After taken from the drying cabinet, the foil was conditioned for 1 h freely suspended and weighted again (dry value). The result is given as arithmetical mean of the weight changes.

Figure 7:
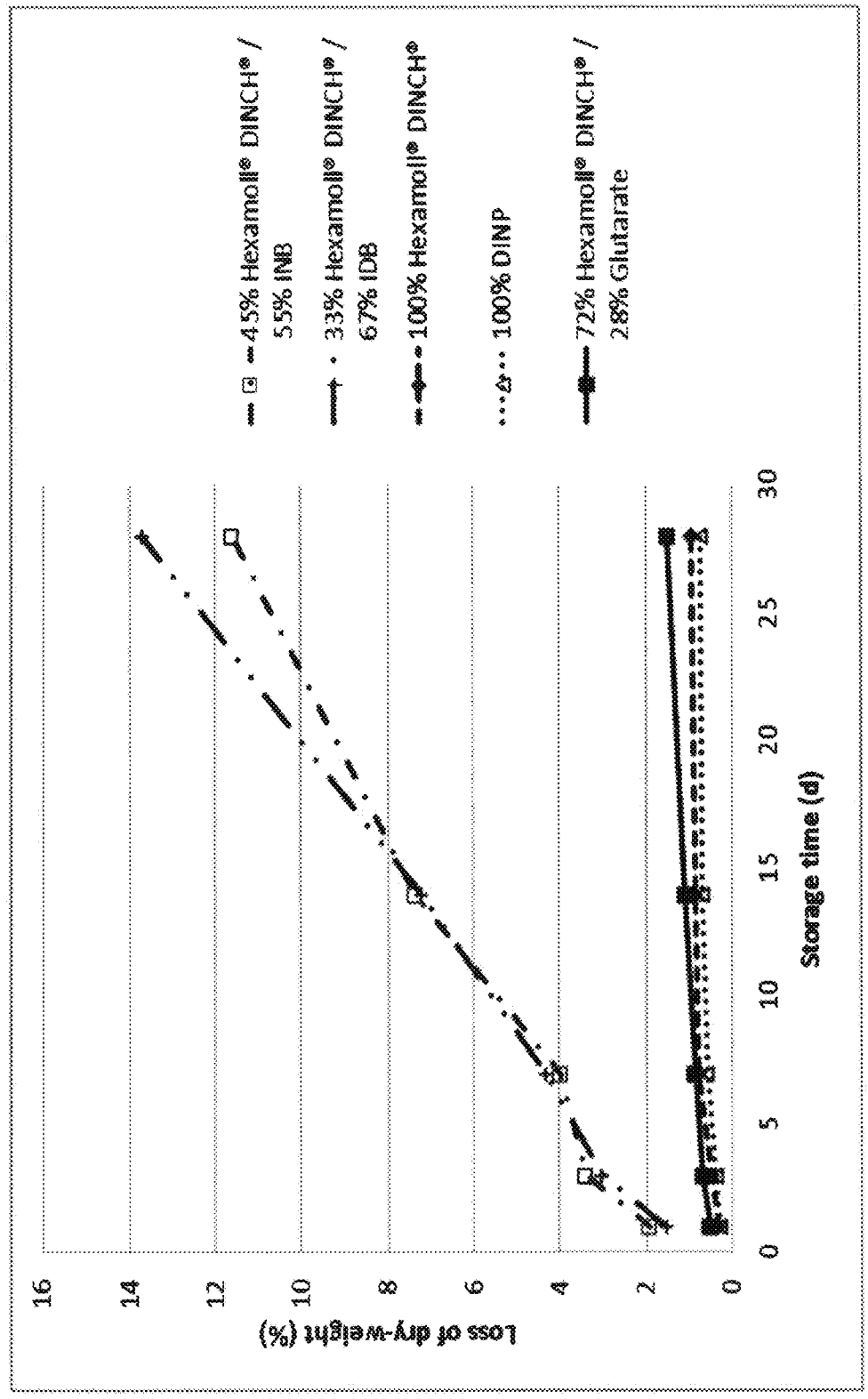
FIG. 7 shows the storage stability of PVC foils that are produced from PVC plastisols containing 60 phr of the plasticizer composition according to the invention as well as of different blends of Hexamoll® DINCH® with the commercially available fast fusers INB (Vestinol® INB) or IDB (Jayflex® MB 10). Displayed is the loss of dry-weight [%] as a function of the storage time [d] at a storage temperature of 70° C. under 100% relative humidity.

FIG. 7 very clearly shows that the exudation behavior of the plasticizer composition of the invention composed of 28% by weight of glutarate and 72% by weight of Hexamoll® DINCH® is significantly better than the exudation behavior of the plasticizer compositions composed of 55% by weight of INB (Vestinol® INB) and 45% by weight of Hexamoll® DINCH® as well as of 67% by weight of IDB (Jayflex® MB 10) and 33% by weight of Hexamoll® DINCH® but slightly worse than the exudation behavior of the pure plasticizers Hexamoll® DINCH® and Palatinol® N, respectively.

The invention claimed is:

1. A plasticizer composition comprising
   a1) one or more compounds of the general formula (I.a),

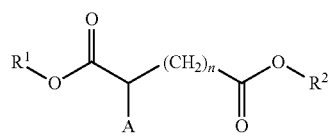

in which
A is methyl or ethyl,
n is 1 or 2 and
$R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and
b) one or more compounds of the general formula (II),

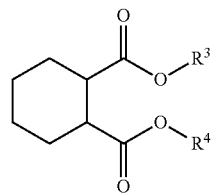

in which
$R^3$ and $R^4$ are selected independently of each other from branched and unbranched $C_7$-$C_{12}$-alkyl moieties.

2. The plasticizer composition according to claim 1, further comprising
   a2) one or more compounds of the general formula (I.b),

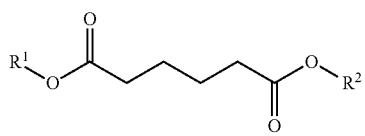

in which
$R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

3. The plasticizer composition according to claim 1, comprising, in each case based on the total weight of compounds (I.a) and, if present, (I.b),

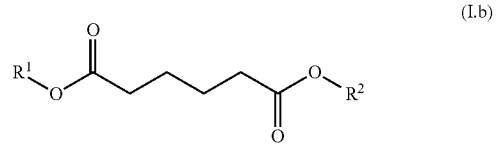

in which
$R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety,
70 to 100% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety, and
0 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

4. The plasticizer composition according to claim 1, comprising, in each case based on the total weight of compounds (I.a) and, if present, (I.b),

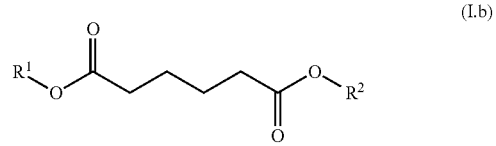

in which
$R^1$ and $R^2$ are selected independently of each other from $C_5$-$C_7$-cycloalkyl, where the cycloalkyl moieties are unsubstituted or can be substituted by at least one $C_1$-$C_1$-alkyl moiety,
70 to 99% by weight of one or more compounds (I.a), wherein A is methyl, n is 2 and $R^1$ and $R^2$ are selected independently of each other from $C_5$-$C_7$-cycloalkyl, where the cycloalkyl moieties are unsubstituted or can be substituted by at least one $C_1$-$C_1$-alkyl moiety, and
1 to 30% by weight of one or more compounds (I.a), wherein A is ethyl, n is 1 and $R^1$ and $R^2$ are selected independently of each other from $C_5$-$C_7$-cycloalkyl, where the cycloalkyl moieties are unsubstituted or can be substituted by at least one $C_1$-$C_{10}$-alkyl moiety.

5. The plasticizer composition according to claim 1, comprising, in each case based on the total weight of compounds (I.a) and, if present, (I.b),

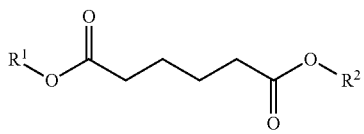

in which
R¹ and R² are selected independently of each other from $C_5$-$C_7$-cycloalkyl, where the cycloalkyl moieties are unsubstituted or can be substituted by at least one $C_1$-$C_{10}$-alkyl moiety,
- 70 to 100% by weight of one or more compounds (I.a), wherein A is methyl, n is 2 and R¹ and R² are selected independently of each other from $C_5$-$C_7$-cycloalkyl, where the cycloalkyl moieties are unsubstituted or can be substituted by at least one $C_1$-$C_{10}$-alkyl moiety,
- 0 to 30% by weight of one or more compounds (I.a), wherein A is ethyl, n is 1 and R¹ and R² are selected independently of each other from $C_5$-$C_7$-cycloalkyl, where the cycloalkyl moieties are unsubstituted or can be substituted by at least one $C_1$-$C_{10}$-alkyl moiety, and
- 0 to 10% by weight of one or more compounds of the general formula (I.b).

6. The plasticizer composition according to claim 1, comprising, in each case based on the total weight of compounds (I.a) and, if present, (I.b),

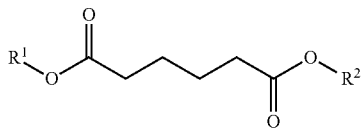

in which
R¹ and R² are selected independently of each other from $C_5$-$C_7$-cycloalkyl, where the cycloalkyl moieties are unsubstituted or can be substituted by at least one $C_1$-$C_{10}$-alkyl moiety,
- 70 to 98% by weight of one or more compounds (I.a), wherein A is methyl, n is 2 and R¹ and R² are selected independently of each other from $C_5$-$C_7$-cycloalkyl, where the cycloalkyl moieties are unsubstituted or can be substituted by at least one $C_1$-$C_{10}$-alkyl moiety,
- 1 to 30% by weight of one or more compounds (I.a), wherein A is ethyl, n is 1 and R¹ and R² are selected independently of each other from $C_5$-$C_7$-cycloalkyl, where the cycloalkyl moieties are unsubstituted or can be substituted by at least one $C_1$-$C_{10}$-alkyl moiety, and
- 1 to 10% by weight of one or more compounds of the general formula (I.b).

7. The plasticizer composition according claim 2, where R¹ and R² in the compounds of the general formulae (I.a) and (I.b) are independently of each other cyclopentyl, cyclohexyl or cycloheptyl.

8. The plasticizer composition according to claim 2, where both of R¹ and R² in the compounds of the general formulae (I.a) and (I.b) are cyclohexyl.

9. The plasticizer composition according to claim 1, where both of R³ and R⁴ in the compounds of the general formula (II) are 2-ethylhexyl or both are isononyl, or both are 2-propylheptyl.

10. The plasticizer composition according to claim 1, where the plasticizer composition comprises at least one further plasticizer, which differs from the compounds (I.a), (I.b)

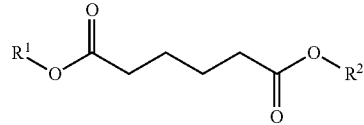

in which
R¹ and R² are selected independently of each other from $C_5$-$C_7$-cycloalkyl, where the cycloalkyl moieties are unsubstituted or can be substituted by at least one $C_1$-$C_{10}$-alkyl moiety,
and (II), and which is selected from the group consisting of dialkyl phthalates, alkyl aralkyl phthalates, dialkyl cyclohexan-1,2-dicarboxylates which differ from compounds (II), dialkyl cyclohexane-1,3-dicarboxylates, dialkyl cyclohexane-1,4-dicarboxylates, dialkyl terephthalates, trialkyl trimellitates, alkyl benzoates, dibenzoic esters of glycols, hydroxybenzoic esters, esters of saturated monocarboxylic acids, esters of unsaturated monocarboxylic acids, esters of saturated dicarboxylic acids which differ from compounds (I.a) and (I.b), esters of unsaturated dicarboxylic acids, amides and esters of aromatic sulfonic acids, alkylsulfonic esters, glycerol esters, isosorbide esters, phosphoric esters, citric triesters, alkylpyrrolidone derivatives, dialkyl 2,5-furan-dicarboxylates, dialkyl 2,5-tetrahydrofurandicarboxylates, epoxidized vegetable oils and epoxidized fatty acid monoalkylesters, and polyesters made of aliphatic and/or aromatic polycarboxylic acids with at least dihydric alcohols.

11. The plasticizer composition according to claim 1, where the content of compounds of the general formulae (I.a) and, if present, (I.b)

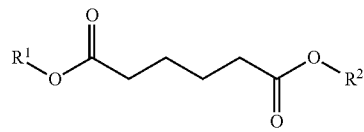

in which
R¹ and R² are selected independently of each other from $C_5$-$C_7$-cycloalkyl, where the cycloalkyl moieties are unsubstituted or can be substituted by at least one $C_1$-$C_{10}$-alkyl moiety,
in the plasticizer composition is from 5 to 70% by weight, based on the total weight of compounds (I.a), (II) and, if present, (I.b) in the plasticizer composition.

12. The plasticizer composition according to claim 1, where the content of compounds of the general formula (II) in the plasticizer composition is from 30 to 95% by weight, based on the total weight of compounds (I.a), (II) and, if present, (I.b)

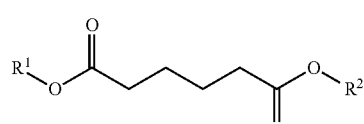

in which
R¹ and R² are selected independently of each other from C₅-C₇-cycloalkyl, where the cycloalkyl moieties are unsubstituted or can be substituted by at least one C₁-C₁₀-alkyl moiety,
in the plasticizer composition.

13. The plasticizer composition according to claim 1, where the ratio by weight of compounds of the general formulae (I.a) and, if present, (I.b)

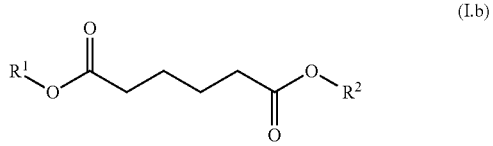

in which
R¹ and R² are selected independently of each other from C₅-C₇-cycloalkyl, where the cycloalkyl moieties are unsubstituted or can be substituted by at least one C₁-C₁₀-alkyl moiety,
to compounds of the general formula (II) is in the range from 1:20 to 2:1.

14. A molding composition comprising at least one polymer and one plasticizer composition as defined in claim 1.

15. The molding composition according to claim 14, where the polymer is a thermoplastic polymer selected from the group consisting of
homo- or copolymers, which comprise at least one copolymerized monomer selected from the group consisting of C₂-C₁₀-monoolefins, 1,3-butadiene, 2-chloro-1,3-butadiene, esters of C₂-C₁₀-alkanoic acids with vinyl alcohol, vinyl chloride, vinylidene chloride, vinylidene fluoride, tetrafluoroethylene, glycidyl acrylate, glycidyl methacrylate, acrylates and methacrylates of C₁-C₁₀-alcohols, vinylaromatics, (meth)acrylonitrile, maleic anhydride, and α,β-ethylenically unsaturated mono- and dicarboxylic acids,
homo- and copolymers of vinyl acetals,
polyvinyl esters,
polycarbonates,
polyesters,
polyethers,
polyether ketones,
thermoplastic polyurethanes,
polysulfides,
polysulfones,
polyether sulfones,
cellulose alkyl esters,
and mixtures thereof.

16. The molding composition according to claim 15, where the thermoplastic polymer is polyvinyl chloride (PVC), polyvinyl butyral (PVB), homo- and copolymers of vinyl acetate, homo- and copolymers of styrene, polyacrylates, thermoplastic polyurethanes (TPU), or polysulfides.

17. The molding composition according to claim 15, where the thermoplastic polymer is polyvinyl chloride (PVC).

18. The molding composition according to claim 17, where the content of the plasticizer composition in the molding composition is from 5.0 to 300 phr.

19. The molding composition according to claim 15, comprising at least one thermoplastic polymer which differs from polyvinyl chloride, where the content of the plasticizer composition in the molding composition is from 0.5 to 300 phr.

20. The molding composition according to claim 14, where the polymer is an elastomer selected from the group consisting of natural rubbers, synthetic rubbers, and mixtures thereof.

21. The molding composition according to claim 20, where the content of the plasticizer composition in the molding composition is from 1.0 to 60 phr.

22. A plastisol comprising the plasticizer composition according to claim 1.

23. A molding comprising the molding composition according to claim 14, wherein the molding is a housing of an electrical device, computer housing, tooling, piping, cables, hoses, wire sheathing, window profiles, profiles for conveyors, vehicle-construction components, tires, furniture, cushion foam and mattress foam, tarpaulins, roofing panels, gaskets, composite foils, self-adhesive foils, laminating foils, recording discs, synthetic leather, packaging containers, adhesive-tape foils, or coatings.

24. Moldings or foils which come directly into contact with people or with foods which comprises the molding composition according to claim 14.

25. A molding comprising the molding composition according to claim 14, wherein the molding comes directly into contact with people or foods and is a medical product, hygiene product, packaging for food or drink, products for the interior sector, toys and child-care items, sports-and-leisure products, apparel, or fibers for textiles.

* * * * *